United States Patent [19]
Kawahara

[11] Patent Number: 5,699,459
[45] Date of Patent: Dec. 16, 1997

[54] IMAGE COMPRESSION DEVICE AND A METHOD OF IMAGE COMPRESSION

[75] Inventor: Kenji Kawahara, Nara, Japan

[73] Assignee: Sharp Kabushiki Kaisha, Osaka, Japan

[21] Appl. No.: 419,613

[22] Filed: Apr. 10, 1995

[30] Foreign Application Priority Data

Dec. 26, 1994 [JP] Japan .................................. 6-323301

[51] Int. Cl.⁶ .................... G06K 9/40; G06K 9/36
[52] U.S. Cl. .................... 382/268; 382/232; 348/420
[58] Field of Search ........................ 382/268, 239, 382/251, 248, 236, 233, 244, 107, 232; 348/415, 420, 421, 607, 608, 405, 413, 699; 371/53; 358/433

[56] References Cited

U.S. PATENT DOCUMENTS 5,355,378 10/1994 Ohta .............................. 371/53

FOREIGN PATENT DOCUMENTS 62-196990 8/1987 Japan ............... H04N 7/133
5-211612 8/1993 Japan ............... H04N 1/41

Primary Examiner—Leo Boudreau
Assistant Examiner—Wenpeng Chen

[57] ABSTRACT

The present invention provides an image compression device for performing an image compression process for each one of a plurality of blocks into which an original image picture is divided, the device including image correction section for generating a corrected image picture for reducing a block distortion occurring at a block boundary in a restored image picture generated by decompressing a compressed image picture. The image correction section performs a process for reducing a block distortion occurring at a block boundary between a target block to be compressed and a processed block already compressed and adjoining the target block by: referring to a restored pixel value of a restored image obtained by decompressing a compressed image of the processed block, and at least one of an original pixel value of an original image of the processed block and a corrected pixel value of a corrected image of the processed block; and performing an operation for the restored pixel value and at least one of the original pixel value and the corrected pixel value so as to generate a corrected pixel value of the target block and output a corrected image for the target block.

22 Claims, 18 Drawing Sheets

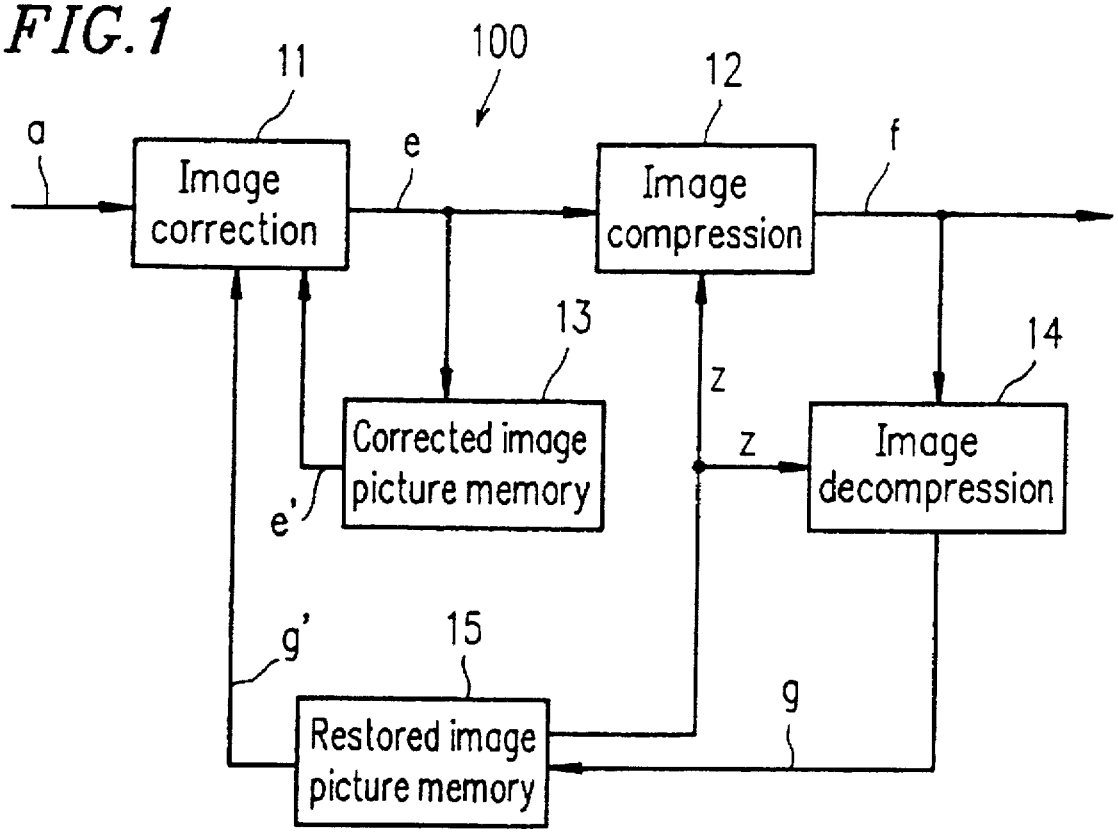

FIG. 3

| | | |
|---|---|---|
| A | B | C |
| D | X | E |
| F | G | H |

FIG. 4A

| | | |
|---|---|---|
| $A_1$ | $B_1$ | $C_1$ |
| $D_1$ | | |
| | | |

FIG. 4B

| | | |
|---|---|---|
| $A_2$ | $B_2$ | $C_2$ |
| $D_2$ | | |
| | | |

FIG. 5A

| | | |
|---|---|---|
| $A_1$ | $B_1$ | $C_1$ |
| $D_1$ | $X_1$ | |
| | | |

FIG. 5B

| | | |
|---|---|---|
| $A_2$ | $B_2$ | $C_2$ |
| $D_2$ | $X_2$ | |
| | | |

FIG. 23
PRIOR ART

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |

FIG. 24
PRIOR ART

| 1 | 2 | 5 | 6 | 9 | 10 | 13 | 14 | 17 | 18 | 21 | 22 | 25 | 26 | 29 | 30 | 33 | 34 | 37 | 38 | 41 | 42 |
|---|---|---|---|---|---|---|---|---|---|---|---|---|---|---|---|---|---|---|---|---|---|
| 3 | 4 | 7 | 8 | 11 | 12 | 15 | 16 | 19 | 20 | 23 | 24 | 27 | 28 | 31 | 32 | 35 | 36 | 39 | 40 | 43 | 44 |
| 45 | 46 | 49 | 50 | | | | | | | | | | | | | | | | | | 86 |
| 47 | 48 | 51 | 52 | | | | | | | | | | | | | | | | | | 88 |
| 89 | | | | | | | | | | | | | | | | | | | | | 130 |
| 91 | | | | | | | | | | | | | | | | | | | | | 132 |
| 133 | | | | | | | | | | | | | | | | | | | | | 174 |
| 135 | | | | | | | | | | | | | | | | | | | | | 176 |
| 177 | | | | | | | | | | | | | | | | | | | | | 218 |
| 179 | | | | | | | | | | | | | | | | | | | | | 220 |
| 221 | | | | | | | | | | | | | | | | | | | | | 262 |
| 223 | | | | | | | | | | | | | | | | | | | | | 264 |
| 265 | | | | | | | | | | | | | | | | | | | | | 306 |
| 267 | | | | | | | | | | | | | | | | | | | | | 308 |
| 309 | | | | | | | | | | | | | | | | | | | | | 350 |
| 311 | | | | | | | | | | | | | | | | | | | | | 352 |
| 353 | | | | | | | | | | | | | | | | | | | | | 394 |
| 355 | 356 | 359 | 360 | 363 | 364 | 367 | 368 | 371 | 372 | 375 | 376 | 379 | 380 | 383 | 384 | 387 | 388 | 391 | 392 | 395 | 396 |

IMAGE COMPRESSION DEVICE AND A METHOD OF IMAGE COMPRESSION

BACKGROUND OF THE INVENTION

1. Field of the Invention

The present invention relates to an image processing technique utilizing a block division method, and particularly to an image compression device and an method of image compression for reducing block distortion.

2. Description of the Related Art

A conventional method commonly adopted in the field of image compression is a block division method, in which one image picture is divided into a plurality of blocks of a fixed size and an image compression process is performed for each block, the process usually being started from the upper left block and performed consecutively for the following blocks.

FIG. 23 illustrates an example of a conventional block division method. As shown in FIG. 23, one image picture is divided into 60 blocks (=10 blocks (horizontally)×6 blocks (vertically)). The respective blocks are numbered as shown in FIG. 23, and the image compression process is performed for each block in the ascending order of the numbers, starting from the upper left block.

The block division method is adopted by several international standards for image compression, e.g., H.261 (A standard on moving picture compression for video phone/video conference), MPEG (Moving Picture Experts Group: A standard on moving picture compression for storage media), and JPEG (Joint Photographic Coding Experts Group: A standard on still picture compression).

FIG. 24 illustrates blocks divided in accordance with a QCIF (Quarter Common Intermediate Format) mode of the H.261 standard. In FIG. 24, an image picture consisting of 176×144 pixels is divided into 396 blocks, each block consisting of 8×8 pixels (i.e., 64 pixels). The numbers attached to the respective blocks indicate the order they are subjected to an image process. In general, as shown in FIG. 24, the upper left block is the first one to be subjected to the image process. According to these international standards, a compression technique utilizing DCT (Discrete Cosine Transform), which is a kind of orthogonal transform, is performed for each one of the divided blocks. These international standards for image compression are summarized in H. Yasuda, "International Standards of Multimedia Encoding" (Maruzen, June 1991), for example.

The adoption of the above-mentioned block division method facilitates the implementation of image compression by reducing the amount of data required for one process. On the other hand, it introduces a problem in that an error occurring during the compression/decompression of an image picture may cause a "block distortion" in the vicinity of boundaries between blocks of a restored (decompressed) image picture, the block distortion being observable by a viewer of the image picture.

FIG. 25 schematically shows a mechanism which causes block distortion. In FIG. 25, it is assumed that blocks D and X are adjoining each other at a block boundary L (indicated by a dot-dash line). It is also assumed that pixels I, J, and K of an original image picture have pixel values of $P_i$, $P_j$, and $P_k$, respectively, and that the pixels I, J, and K take pixel values of $Q_i$, $Q_j$, and $Q_k$ in a restored image picture which is obtained by compressing and then decompressing the original image picture. Herein, it is further assumed that, during the compression/decompression of the original image, an error has occurred in the block D that increases the pixel values thereof, and that an error has occurred in the block X that decreases the pixel values thereof. As shown in FIG. 25, the pixel values $P_i$, $P_j$, and $P_k$ have only a smooth change in the vicinity of the block boundary L of the original image picture. However, in the restored image picture, the pixel values $Q_i$, $Q_j$, and $Q_k$ have a drastic change in the vicinity of the block boundary L, thus resulting in a discontinuous curve. This discontinuity is observed as a block distortion along the block boundary L. Various conventional techniques have been employed in order to eliminate such block distortion.

One conventional technique performs the reduction of block distortion in an image decompression device. According to this technique, after a restored image picture is obtained by means of an image decompression device, the restored image picture is further applied to a block distortion elimination filter, whereby an image picture with reduced block distortion is obtained. Hereinafter, this technique will be referred to as "the first conventional technique".

FIG. 26 is a block diagram showing a configuration for a video phone system in accordance with the H.261 standard. The video phone system includes an image decompression device incorporating a block distortion elimination filter.

As shown in FIG. 26, an image compression device 1 performs a predetermined image compression process for an input original image picture signal a at an image compression section 3, without accounting for any block distortion occurring in an image decompression device 2 during the image decompression. The image compression device 1 outputs a compressed image picture signal b as a result of the image compression. The output compressed image picture signal b is input to the image decompression device 2 via a communication path 4 for transferring image pictures. The image decompression device 2 performs an image decompression process for the received compressed image picture signal b at an image decompression section 5 so as to generate a restored image picture signal c. Thereafter, the restored image picture signal c is applied to a block distortion elimination filter 6, which outputs a restored image picture signal d free of the block distortion. The block distortion elimination filter 6 is composed of a low-pass filter, so that the pixel value discontinuity in the vicinity of block boundaries is minimized. Japanese Laid-Open Patent Publication No. 62-196990, for example, describes a method entitled "A method for encoding image data through orthogonal transform", in which pixels in the vicinity of block boundaries of a restored image picture are subjected to a correction process which brings the image data so as to be close to extrapolated image data in an asymptotic manner, the extrapolated image data being obtained from adjoining blocks. As a result, the block distortion present in the vicinity of the block boundaries is reduced.

In the image compression device 1 of FIG. 26, the compressed image picture signal b is input to the image decompression device 7, and is further input to the image compression section 3 via a restored image picture memory 8. The reason for this configuration is that the image compression process utilizes a difference between the decompressed restored image picture data and the original image picture signal a.

Another conventional technique performs the reduction of block distortion in an image compression device. Japanese Laid-Open Patent Publication No. 5-211612, for example, describes an invention entitled "A data compression and decompression device". The image compression device derives an error between an original image picture and a restored image picture after compressing the original image picture, and performs an image compression process for varying a quantization parameter until the error becomes sufficiently small. Hereinafter, this technique will be referred to as "the second conventional technique".

According to the first conventional technique, in which the reduction of block distortion is conducted by incorporating a low-pass filter into an image decompression device, the effect of reducing block distortion may not be sufficiently attained for the following reasons. First, according to the first conventional technique, it is impossible to determine the cause of discontinuity of pixel values in the vicinity of a block boundary of a restored image picture to be either due to block distortion or inherent to the characteristics of the original image picture (for example, the intensity of the original image picture may drastically vary in the vicinity of the block boundary). Accordingly, especially in the case of an image picture containing an image which makes drastic changes, the quality of the restored image picture may deteriorate. Secondly, in the case where one low-pass filter is used to process one restored image picture, the block distortion in a portion of the image picture may not be sufficiently eliminated because of the filter having too small an effect for that portion, while another portion of the image picture may have its block boundaries blurred because of the filter having too large an effect for that portion.

According to the second conventional technique, in which the reduction of block distortion is performed in an image compression device, the image compression process must be repeated until the error between the original image picture and the restored image picture becomes sufficiently small. This inevitably results in a long processing time, and the processing time varies depending on the original image picture, too. Therefore, the second conventional technique cannot be applied to devices which require instantaneous processing (real-time processing), e.g., video phone/video conference systems.

SUMMARY OF THE INVENTION

An image compression device for performing an image compression process for each one of a plurality of blocks into which an original image picture is divided according to the present invention includes: an image correction section for generating a corrected image picture for reducing a block distortion occurring at a block boundary in a restored image picture generated by decompressing a compressed image picture, wherein the image correction section performs a process for reducing the block distortion occurring at a block boundary between a target block to be compressed and a processed block already compressed and adjoining the target block by: referring to a restored pixel value of a restored image obtained by decompressing a compressed image of the processed block, and at least one of an original pixel value of an original image of the processed block and a corrected pixel value of a corrected image of the processed block; and performing an operation for the restored pixel value and at least one of the original pixel value and the corrected pixel value so as to generate a corrected pixel value of the target block and output a corrected image for the target block.

In one embodiment of the invention, the image correction section includes: a first pixel value operation section for performing a predetermined operation based on a restored pixel value and at least one of an original pixel value and a corrected pixel value of a reference pixel present in a predetermined position in the processed block and outputting a result of the operation as a first pixel value; a second pixel value operation section for performing a correction process, based on the first pixel value, for an original pixel value of a target pixel present in a predetermined position of the target block corresponding to the reference pixel of the processed block and outputting a second pixel value; and selection means for selecting either the original pixel value of the reference pixel or the second pixel value and outputting the selected pixel value as a corrected pixel value of the target pixel.

In another embodiment of the invention, the image compression device further includes an image compression section for generating the compressed image by performing a predetermined image compression process for the corrected image output from the image correction section, and an image decompression section for generating the restored image by decompressing the compressed image.

In still another embodiment of the invention, the second pixel value operation section includes a setting section for setting a correction coefficient K and correction operation means.

In still another embodiment of the invention, the correction operation section includes: a first operation section for performing a first operation for the first pixel value by using the correction coefficient K; and a second operation section for performing a second operation for an output of the first operation section and the original pixel value of the target pixel and outputting the second pixel value.

In still another embodiment of the invention, the first pixel value operation section is a subtracter for outputting a difference value between the restored pixel value and either the original pixel value or the corrected pixel value of the reference pixel; the first operation section is a multiplier for outputting a multiplied value obtained by multiplying the difference value by the correction coefficient K; the second operation section is an adder for outputting a value obtained by adding the multiplied value to the original pixel value of the target pixel; and the correction coefficient K has a value in the range of 0<K<1.

In still another embodiment of the invention, the image compression device further includes first image storage means for storing either an input original image picture or the corrected image output from the image correction section, and second image storage section for storing the restored image output from the image decompression means.

In still another embodiment of the invention, the first pixel value operation section performs the predetermined operation by using the corrected pixel value of the corrected image stored in the first image storage means and the restored pixel value of the restored image stored in the second image storage means.

In still another embodiment of the invention, the target pixel, for which the correction process is performed by using the reference pixel, consists of at least one row and one column of pixel adjoining the block boundary.

In still another embodiment of the invention, the target pixel, for which the correction process is performed by using the reference pixel, consists of a plurality of rows and columns of pixels adjoining the block boundary, and the second pixel value operation means includes section for varying a value of the correction coefficient K in accordance with a distance between the block boundary and each of the plurality of rows and columns of pixels.

In still another embodiment of the invention, the selection section outputs the second pixel value for the target pixel located at the block boundary, the correction process being performed for the target pixel by using the reference pixel, and outputs the original pixel value for any other pixel.

A method of image compression according to the present invention includes performing an image compression process for each one of a plurality of blocks into which an original image picture is divided, the method further including a step of image correction for generating a corrected image picture for reducing a block distortion occurring at a block boundary in a restored image picture generated by decompressing a compressed image picture, wherein the image correction step includes, so as to reduce the block distortion occurring at a block boundary between a target block to be compressed and a processed block already compressed and adjoining the target block, the steps of: referring to a restored pixel value of a restored image obtained by decompressing a compressed image of the processed block, and at least one of an original pixel value of an original image of the processed block and a corrected pixel value of a corrected image of the processed block; and performing an operation for the restored pixel value and at least one of the original pixel value and the corrected pixel value so as to generate a corrected pixel value of the target block and output a corrected image for the target block.

In one embodiment of the invention, the image correction step includes: a first pixel value operation step for performing a predetermined operation based on a restored pixel value and at least one of an original pixel value and a corrected pixel value of a reference pixel present in a predetermined position in the processed block and outputting a result of the operation as a first pixel value; a second pixel value operation step for performing a correction process, based on the first pixel value, for an original pixel value of a target pixel present in a predetermined position of the target block corresponding to the reference pixel of the processed block and outputting a second pixel value; and a step for selecting either the original pixel value of the reference pixel or the second pixel value and outputting the selected pixel value as a corrected pixel value of the target pixel.

In another embodiment of the invention, the method further includes an image compression step for generating the compressed image by performing a predetermined image compression process for the corrected image and an image decompression step for generating the restored image by decompressing the compressed image.

In still another embodiment of the invention, the second pixel value operation step includes a step of setting a correction coefficient K and a correction operation step.

In still another embodiment of the invention, the correction operation step includes: a first operation step for performing a first operation for the first pixel value by using the correction coefficient K; and a second operation step for performing a second operation for a result of the first operation step and the original pixel value of the target pixel and outputting the second pixel value.

In still another embodiment of the invention, the first pixel value operation step is a step for generating a difference value between the restored pixel value and either the original pixel value or the corrected pixel value of the reference pixel; the first operation step is a step for generating a multiplied value obtained by multiplying the difference value by the correction coefficient K; the second operation means is a step for generating a value obtained by adding the multiplied value to the original pixel value of the target pixel; and the correction coefficient K has a value in the range of 0<K<1.

In still another embodiment of the invention, the method further includes a step of storing either an input original image picture or the corrected image, and a step of storing the generated restored image.

In still another embodiment of the invention, the predetermined operation in the first pixel value operation step is performed by using the stored corrected pixel value of the corrected image and the stored restored pixel value of the restored image.

In still another embodiment of the invention, the target pixel, for which the correction process is performed by using the reference pixel, consists of at least one row and one column of pixel adjoining the block boundary.

In still another embodiment of the invention, the target pixel, for which the correction process is performed by using the reference pixel, consists of a plurality of rows and columns of pixels adjoining the block boundary, and the second pixel value operation step includes a step of varying a value of the correction coefficient K in accordance with a distance between the block boundary and each of the plurality of rows and columns of pixels.

In still another embodiment of the invention, the selection step is a step for outputting the second pixel value for the target pixel located at the block boundary, the correction process being performed for the target pixel by using the reference pixel, and for outputting the original pixel value for any other pixel.

As described above, according to the present invention, there are provided an image compression device and a method of image compression for effectively reducing block distortion of a restored image picture without requiring a long processing time for the compression/decompression of the image picture data and without allowing the processing time to vary depending on the original image picture.

These and other advantages of the present invention will become apparent to those skilled in the art upon reading and understanding the following detailed description with reference to the accompanying figures.

BRIEF DESCRIPTION OF THE DRAWINGS

FIG. 1 is a block diagram showing a configuration for an image compression device according to an example of the present invention.

FIG. 2 is a diagram showing an example of block division before an image compression process by the image compression device according to the present invention.

FIG. 3 is a diagram showing 9 adjoining blocks among the divided blocks.

FIG. 4A is a schematic diagram showing the content of a corrected image picture memory before subjecting a compression target block to an image compression.

FIG. 4B is a schematic diagram showing the content of a restored image picture memory before subjecting a compression target block to an image compression.

FIG. 5A is a schematic diagram showing the content of a corrected image picture memory after subjecting a compression target block to an image compression.

FIG. 5B is a schematic diagram showing the content of a restored image picture memory after subjecting a compression target block to an image compression.

FIG. 23 is a diagram for describing an example of a conventional block division.

FIG. 24 is a diagram for describing block division in accordance with a QCIF (Quarter Common Intermediate Format) mode of the H.261 standard.

DESCRIPTION OF THE PREFERRED EMBODIMENTS

Figure 6:
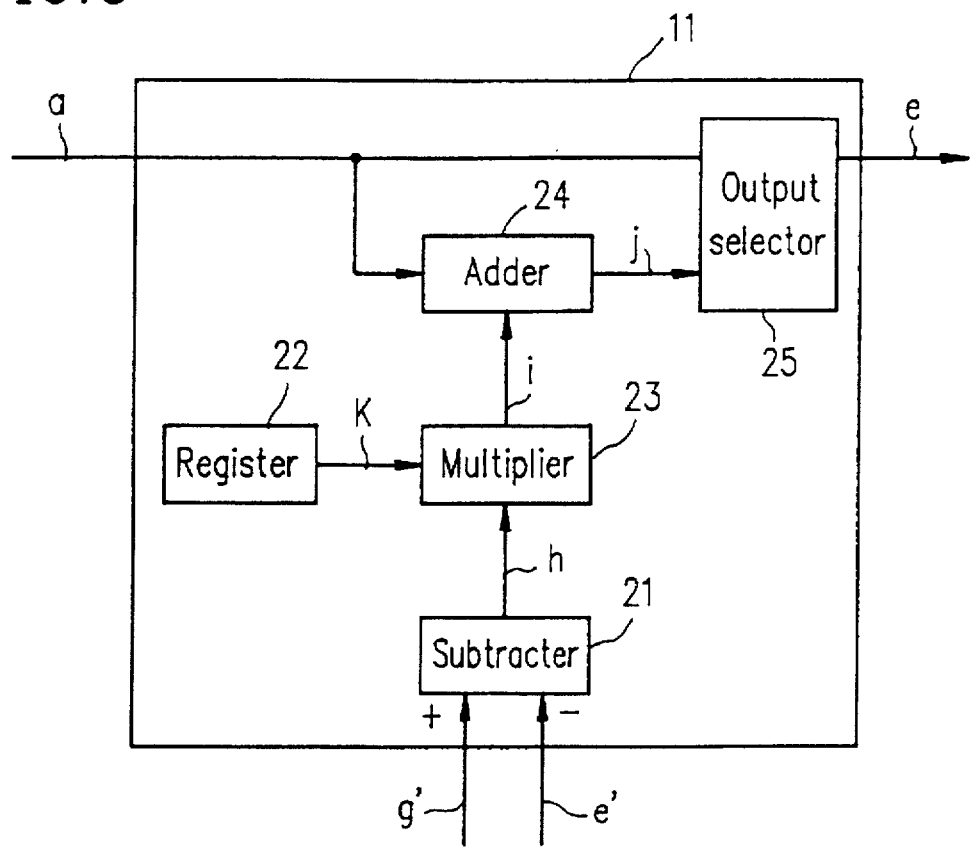
FIG. 6 is a block diagram showing details of an exemplary configuration for an image correction section 11 according to an example of the present invention.

Hereinafter, the present invention will be described by way of examples.

FIG. 1 schematically shows a configuration for an image compression device 100 according to an example of the present invention. As shown in FIG. 1, the image compression device 100 includes an image correction section 11, an image compression section 12, a corrected image picture memory 13, an image decompression section 14, and a restored image picture memory 15. An original image picture signal a is input to the image correction section 11. The image correction section 11 performs an image correction process for the original image picture signal a, and outputs a corrected image picture signal e. The corrected image picture signal e is input to the image compression section 12 and the corrected image picture memory 13. The image compression section 12 performs an image compression process for the corrected image picture signal e. The corrected image picture memory 13 stores the corrected image picture signal e.

A compressed signal f output from the image compression section 12 is input to the image decompression section 14. The image decompression section 14 performs an image decompression process for the compressed signal f so as to output a restored image picture signal g. The restored image picture signal g is stored in the restored image picture memory 15. The corrected image picture memory 13 and the restored image picture memory 15 are connected to the image correction section 11. The corrected image picture memory 13 outputs a corrected image picture signal e' stored therein to the image correction section 11, whereas the restored image picture memory 15 outputs a restored image picture signal g' stored therein to the image correction section 11.

The image correction section 11 performs a correction process for the original image picture signal a by referring to the corrected image picture signal e' and the restored image picture signal g', so that the distortion at the respective boundaries between a plurality of blocks into which an original image picture is divided becomes little. Thus, the image correction section 11 outputs a corrected image picture signal e.

The restored image picture memory 15 is also connected to the image compression section 12 so as to input a restored image picture data signal z to the image compression section 12. The image compression section 12 performs an image compression process by utilizing a difference between the restored image picture data signal z and the corrected image picture signal e (or the original image picture signal a) supplied from the image correction section 11. The restored image picture memory 15 is also connected to the image decompression section 14 so as to input the restored image picture data signal z to the image decompression section 14. The image decompression section 14 performs an image decompression process by utilizing a sum of the restored image picture data signal z and the compressed signal f supplied from the image compression section 12.

Hereinafter, an operation of the image compression device 100 will be described in more details.

The original image picture signal a is a data signal of a plurality of blocks into which an image picture is divided as exemplified in FIG. 2, and one block's equivalent of the original image picture signal a is input to the image compression section 100 after another in a sequential manner. The image correction section 11, to which the original image picture signal a is input, performs an image correction process for the original image picture signal a by referring to the corrected image picture signal e' and the restored image picture signal g', so that the distortion at the respective boundaries between blocks is reduced. Thus, the image correction section 11 outputs the corrected image picture signal e. The image compression section 12 receives the corrected image picture signal e, and performs a predetermined image compression process for the corrected image picture signal e so as to generate the compressed signal f. The image decompression section 14 receives the compressed signal f and performs a predetermined image decompression process for the compressed signal f so as to generate the restored image picture signal g. Thus, the image decompression section 14 outputs the restored image picture signal g. The corrected image picture signal e and the restored image picture signal g are stored in the corrected image picture memory 13 and the restored image picture memory 15, respectively, so as to be referred to as the corrected image picture signal e' and the restored image picture signal g', respectively, when the original image picture signal a is later subjected to an image correction process. The output from the image compression device 100 is the compressed signal f, which is output from the image compression section 12. The compressed signal f is transferred via a communication path so as to be received by an image decompression device (not shown), which decompresses the compressed signal f. The image picture restored by the image decompression device has little block distortion.

Hereinafter, the constituent elements of the image compression device 100 and operations thereof will be described in more details.

Herein, it is assumed that the image compression process is sequentially conducted for the divided blocks shown in FIG. 2 in the order of the numbers assigned thereto. FIG. 3 shows 9 adjoining blocks arbitrarily selected out of the blocks in FIG. 2. The operations of the respective constituent elements will be described below with respect to a case where an image correction process is conducted for a block X located in the center of the 9 blocks. The other 8 blocks around the block X are referred to as blocks A, B, C, D, E, F, G, and H, respectively, starting from the upper left block and read from left to right.

(1) the corrected image picture memory 13 and the restored image picture memory 15:

Image picture data is stored in each of the corrected image picture memory 13 and the restored image picture memory 15 in a predetermined format. For example, if each pixel data of the image picture data is expressed by 8 bits, an 8bit/word memory is used to store pixel data at position (x, y) in address (x+w*y), where w represents the number of pixels present along the horizontal direction in the image picture.

FIGS. 4A and 4B schematically show the contents of the corrected image picture memory 13 and the restored image picture memory 15, respectively, before subjecting the block X to a compression process. FIG. 5A and 5B schematically show the contents of the corrected image picture memory 13 and the restored image picture memory 15, respectively, after subjecting the block X to a compression process.

As shown in FIG. 3, at a point of time before subjecting the block X to an image compression process, the blocks A, B, C, and D (among the 8 blocks adjoining the block X) have already been subjected to an image compression process. Accordingly, as shown in FIG. 4A, a 4 block equivalent of corrected image picture data $A_1$, $B_1$, $C_1$, and $D_1$ which have already been processed (hereinafter, each of these data $A_1$, $B_1$, $C_1$, and $D_1$ will be referred to as "corrected image data") are stored in the corrected image picture memory 13.

Similarly, as shown in FIG. 4B, a 4 block equivalent of restored image picture data $A_2$, $B_2$, $C_2$, and $D_2$ which have already been processed (hereinafter, each of these data $A_2$, $B_2$, $C_2$, and $D_2$ will be referred to as "restored image data") are stored in the restored image picture memory 15. Similarly, data corresponding to each of the blocks A, B, C, and D of the original image picture will be referred to as "original image data". The image picture data corresponding to the other 5 blocks, i.e., E, F, G, and H, are not stored in either memory yet.

By processing the block X, corrected image data $X_1$ and restored image data $X_2$ are obtained. As a result, a 5 block equivalent of processed image picture data is stored in both the corrected image picture memory 13 and the restored image picture memory 15, as shown in FIGS. 5A and 5B, respectively.

The corrected image picture memory 13 stores corrected image picture data (i.e., the corrected image picture signal e shown in FIG. 1), which is sequentially output from the image correction section 11. The restored image picture memory 15 stores restored image picture data (i.e., the restored image picture signal g shown in FIG. 1), which is sequentially output from the image decompression section 14. The corrected image picture data stored in the corrected image picture memory 13 is output as processed corrected image picture data (i.e., the corrected image picture signal e' in FIG. 1) to the image correction section 11, so as to be availed for the image correction process of subsequent blocks. The restored image picture data stored in the restored image picture memory 15 is output as processed restored image picture data (i.e., the restored image picture signal g' in FIG. 1) to the image correction section 11, so as to be availed for the image correction process of subsequent blocks.

The corrected image picture memory 13 has a memory capacity at least large enough to store two rows of divided blocks (i.e., pixel data corresponding to 16 lines under the condition that each block consists of 8×8 blocks). The restored image picture memory 15 is required to have a memory capacity for storing image data equivalent to one image picture, in view of the image compression process.

(2) the image correction section 11:

FIG. 6 is a block diagram showing details of an exemplary configuration for the image correction section 11 according to an example of the present invention.

As shown in FIG. 6, the image correction section 11 includes a subtracter 21, a register 22, a multiplier 23, an adder 24, and an output selector 25. The subtracter 21 derives a difference value h between the restored image picture signal g' and the corrected image picture signal e' so as to output the difference value h to the multiplier 23. The register 22 retains a correction coefficient K as a parameter, and outputs the correction coefficient K to the multiplier 23. The multiplier 23 multiplies the difference value h and the correction coefficient K so as to output the result of the multiplication to the adder 24 as a multiplied signal i. The adder 24 adds the input original image picture signal a and the multiplied signal i so as to output the result of the addition to the output selector 25 as an added signal j. The input original image picture signal a is also directly supplied to the output selector 25. The output selector 25 switches between the original image picture signal a and the added signal j so as to output either one of the signals a and j as the corrected image picture signal e indicating a corrected pixel value to be output.

In other words, an operation represented by the following Equation 1 is performed in the image correction section 11 by using the subtracter 21, the register 22, the multiplier 23, and the adder 24:

$$R_j = P_j + K \times (Q_i - P_i):$$  Eq. 1 wherein $P_i$ represents a pixel value of a pixel at a block boundary in the corrected image picture signal e';

$Q_i$ represents a pixel value of the pixel at the block boundary in the restored image picture signal g';

$P_j$ represents a pixel value of the pixel at the block boundary in the original image picture signal a;

K represents the above-mentioned correction coefficient stored in the register 22; and $R_j$ represents a pixel value in the added signal j.

The output selector 25 outputs the added signal j for, among the pixels in a compression target block (i.e., a block to be compressed), any pixel adjoining a block that has already been compressed. For the other pixels, the output selector 25 outputs the original image picture signal a. The corrected image picture signal e is defined as an output signal which is thus switched between the two signals j and a.

As described above, a block to be compressed may be referred to as a "compression target block" for convenience hereinafter. Similarly, any pixel whose pixel value is to be subjected to a correction may be referred to as a "target pixel" for convenience hereinafter.

Figure 7:
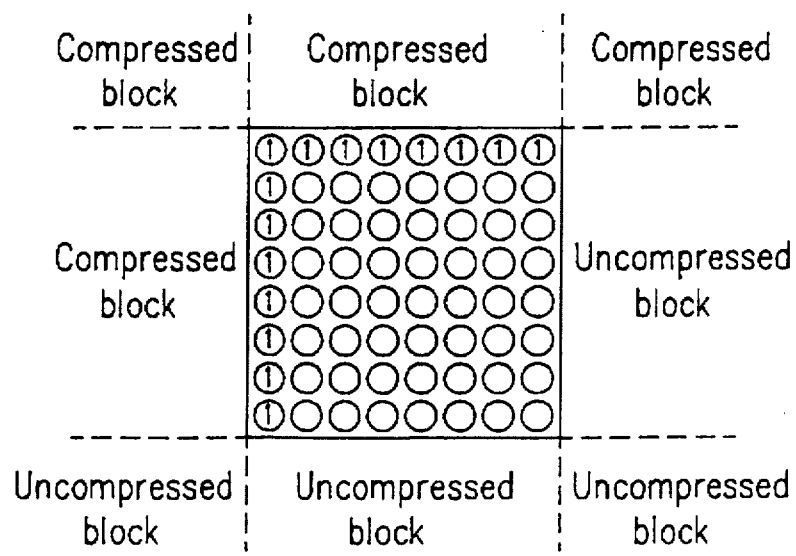
FIG. 7 is a diagram for describing the switching of correction processes at boundaries between compressed blocks and a compression target block according to an example of the present invention.

FIG. 7 describes the switching of the correction process performed at a boundary between compressed blocks and a compression target block.

In FIG. 7, it is assumed that each block consists of 8×8 pixels. The output selector 25 counts the addresses of pixels by means of a counter. If the counting is conducted for every block, any pixel in the compression target block that has a counted address value from 0 to 7 or a multiple of 8 is a pixel adjoining a boundary with a compressed block. Accordingly, when a given pixel takes one of the above-mentioned counted address values, the added signal j is selected in accordance with a control signal having a value "1", for example, so as to be output from the output selector 25. When a given pixel takes any other counted address value, the original image picture signal a is selected in accordance with a control signal having a value "0", for example, so as to be output from the output selector 25.

In other words, the image correction process in accordance with Eq. 1 is performed for the pixels (target pixels) indicated by the encircled 1 in FIG. 7 so as to select and output the added signal j as the corrected image picture signal e. On the other hand, this image correction process is not performed for the pixels indicated by blank circles, and the input original image picture signal a is selected so as to be output as the corrected image picture signal e.

Hereinafter, the principle behind Eq. 1 above will be described.

Figure 8:
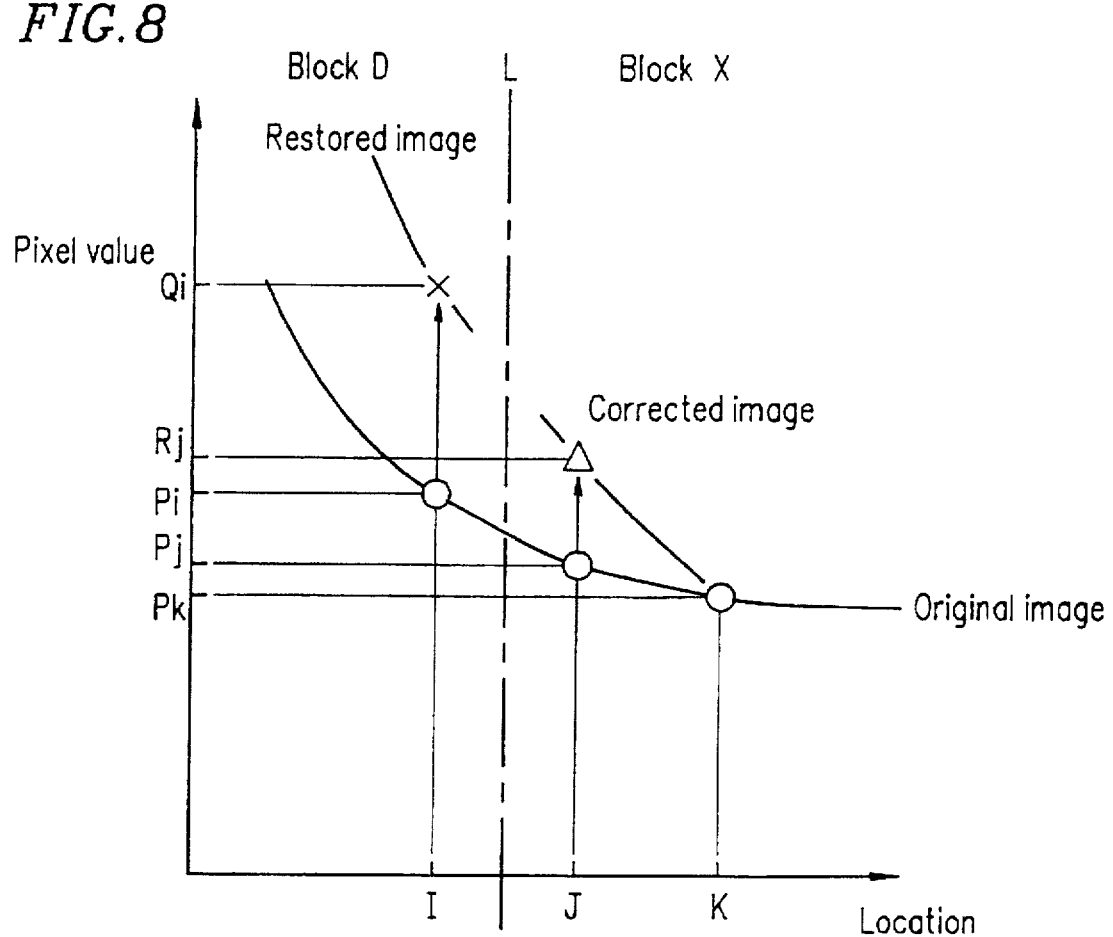
FIG. 8 is a diagram for describing a correction process for a block boundary, the correction process being conducted by an image correction section 11 according to an example of the present invention.

In FIG. 8, a block D and a block X are adjoining each other at a block boundary L indicated by a dot-dash line. It is assumed in FIG. 8 that the block D on the left side of the block boundary L is a compressed block, and that the block X on the right side of the block boundary L is a compression target block (i.e., waiting to be compressed). A pixel value of a pixel I, defined as a pixel in the block D that adjoins the block boundary L, in the corrected image picture is defined as $P_i$. (In the present case, $P_i$ is a pixel value in the original image picture signal a or the added signal j, which is output as the corrected image picture signal e from the image correction section 11.) A pixel value of the pixel I in the restored image picture (i.e., the pixel value in the restored image picture signal g') is defined as $Q_i$. A pixel value of a pixel J, defined as a pixel in the block X that adjoins the block boundary L, in the original image picture is defined as $P_j$.

Hereinafter, any pixel in a compressed block that is utilized for the correction of a pixel value of a target pixel in a compression target block may be referred to as a "reference pixel" for convenience.

Even if no error occurs for the pixel J when performing an image compression process and then an image decompression process for an original image picture (so that the pixel J in the restored image picture has a pixel value equal to the pixel value $P_j$ in the original image picture), there occurs a drastic change in the pixel value at the block boundary L, i.e., from $Q_i$ to $P_j$, as opposed to the smooth change in the original image picture, i.e., from $P_i$ to $P_j$. This discontinuity of pixel values is recognized as block distortion.

- In order to eliminate such block distortion, the image compression device of the present invention corrects the pixel value by, in accordance with Eq. 1 above, deriving a difference ("$Q_i - P_i$") between the pixel value $P_i$ of the pixel I (i.e., the reference pixel in the processed block D) in the original image picture and the pixel value $Q_i$ of the pixel I in the restored image picture, and adding a value ("$K \times (Q_i - P_i)$") obtained by multiplying the difference by the correction coefficient K to the pixel value $P_j$, whereby the corrected pixel value $R_j$ is obtained.

The correction coefficient K may have any value, but is preferably in the range of 0<K<1. A constant which is inherent to the device may be used as the value of the correction coefficient K. Alternatively, the correction coefficient K may be a value adjustable from outside depending on the conditions under which the device is used. More preferably, the correction coefficient K has a value slightly smaller than ½.

Figure 9:
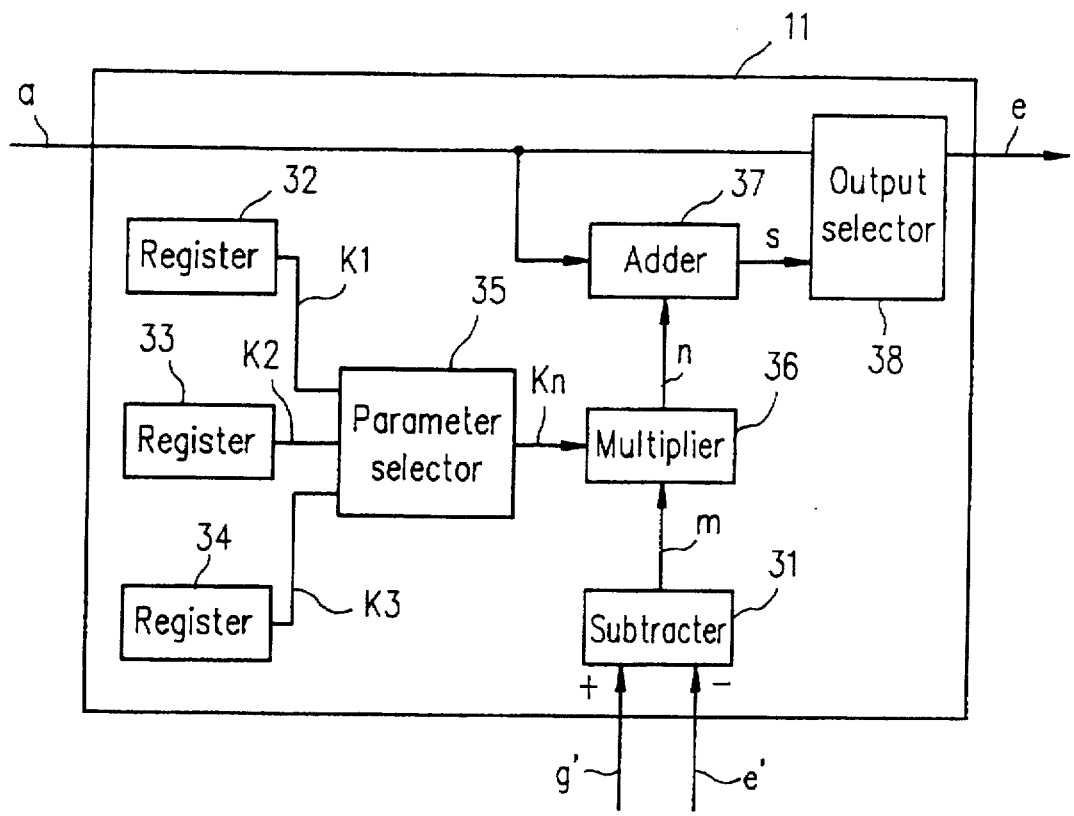
FIG. 9 is a block diagram showing details of an exemplary configuration for an image correction section 11 according to another example of the present invention.

FIG. 9 is a block diagram showing a configuration for the image correction section 11 according to another example of the present invention.

As shown in FIG. 9, the image correction section 11 includes a subtracter 31, registers 32 to 34, a parameter selector 35, a multiplier 36, an adder 37, and an output selector 38. The subtracter 31 derives a difference value m between the restored image picture signal g' and the corrected image picture signal e' so as to output the difference value m to the multiplier 36. The registers 32, 33, and 34 retain different correction coefficients $K_1$, $K_2$, and $K_3$, respectively, as parameters, and output their respective correction coefficients $K_n$ (where n=1, 2, or 3) to the parameter selector 35. The parameter selector 35 selects one of the correction coefficients $K_1$, $K_2$, and $K_3$ and outputs the selected correction coefficients $K_n$ (where n=1, 2, or 3) to the multiplier 36. The multiplier 36 multiplies the difference value h and the correction coefficients $K_n$ so as to output the result of the multiplication to the adder 37 as a multiplied signal n. The adder 37 adds the input original image picture signal a and the multiplied signal n so as to output the result of the addition to the output selector 38 as an added signal s. The input original image picture signal a is also directly supplied to the output selector 38. The output selector 38 switches between the original image picture signal a and the added signal s so as to output either one of the signals a and s as the corrected image picture signal e indicating a corrected pixel value to be output.

The operation represented by Eq. 1 above is performed by using the subtracter 31, the registers 32 to 34, the parameter selector 35, the multiplier 36, and the adder 37 in the same manner as described above except for the following aspects.

The present example utilizes a plurality of (e.g., three) correction coefficients having different values from one another, as opposed to the above-described example illustrated in FIG. 6, where only one correction coefficient is used. The correction coefficients $K_n$ are prescribed so as to have smaller values as the distance between the target pixel in a compression target block and a block boundary (between the compression target block and compressed blocks) increases. Specifically, one of correction coefficients supplied from a plurality of (e.g., three, as in the present example) registers 32 to 34 is selected by means of the parameter selector 35.

The output selector 38 outputs the added signal s for, among the pixels in a compression target block, any pixel present in the vicinity of a boundary with a compressed block. For the other pixels, the output selector 38 outputs the original image picture signal a. The corrected image picture signal e is defined as an output signal which is thus switched between the two signals s and a.

Figure 10:
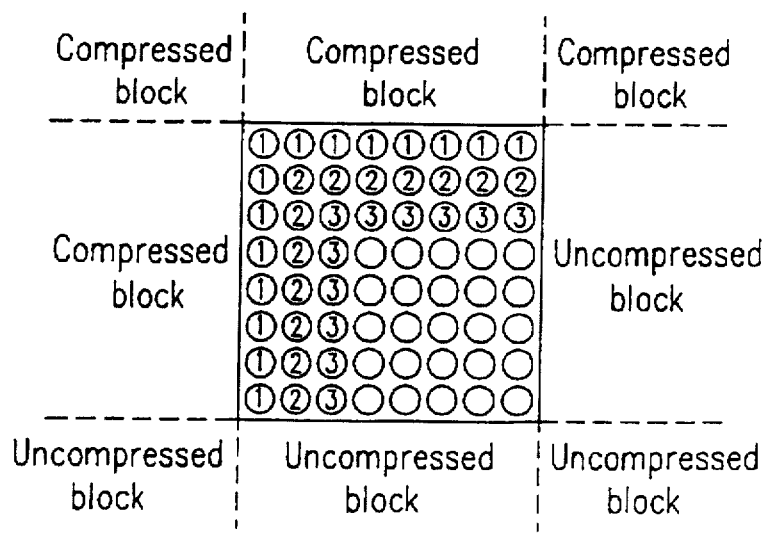
FIG. 10 is a diagram for describing the switching of correction processes at boundaries between compressed blocks and a compression target block according to another example of the present invention.

FIG. 10 illustrates the switching of correction processes at boundaries between compressed blocks and a compression target block according to the present example.

In FIG. 10, it is assumed that each block consists of 8×8 pixels. The output selector 38 counts the addresses of pixels by means of a counter. If the counting is conducted for every block, any pixel in the compression target block that has a counted address value from 0 to 7 or a value 8p (where p is an integer from 1 to 7) (indicated by the encircled 1 in FIG. 10) is adjoining a boundary with a compressed block. The second closest pixel to the block boundary is any pixel in the compression target block that has a counted address value from 9 to 15 or a value 8p+1 (where p is an integer from 2 to 7) (indicated by the encircled 2 in FIG. 10). The third closest pixel to the block boundary is any pixel in the compression target block that has a counted address value from 18 to 23 or a value 8p+2 (where p is an integer from 3 to 7) (indicated by the encircled 3 in FIG. 10).

When a given pixel takes one of the above-mentioned counted address values, the correction coefficients $K_1$, $K_2$, and $K_3$ are selected for the target pixels indicated by the encircled 1, the target pixels indicated by the encircled 2 and the target pixels indicated by the encircled 3, respectively, by using appropriate control signals. Then, the image correction process in accordance with Eq. 1 is performed for the target pixels indicated by encircled 1, 2, or 3 in FIG. 10, and the added signal s is generated, so that the output selector 38 selects and outputs the added signal s as the corrected image picture signal e. On the other hand, the image correction process is not performed for the pixels indicated by blank circles in FIG. 10, and the input original image picture signal a is selected so as to be output as the corrected image picture signal e.

By prescribing the correction coefficients so as to satisfy the relationship $0<K_3<K_2<K_1$, for example, it becomes possible to perform a more intense image correction process for pixels nearer a boundary with a compressed block, and less intense image correction process for pixels farther from the boundary.

(3) the image compression section 12 and the image decompression section 14:

The image compression/decompression method to be adopted at the image compression section 12 and the image decompression section 14 can be any method using a block division method, in general. For example, FIGS. 11 and 12 show exemplary configurations for the image compression section 12 and the image decompression section 14, respectively, in the case where orthogonal transform is adopted as the image compression/decompression method.

Figure 11:
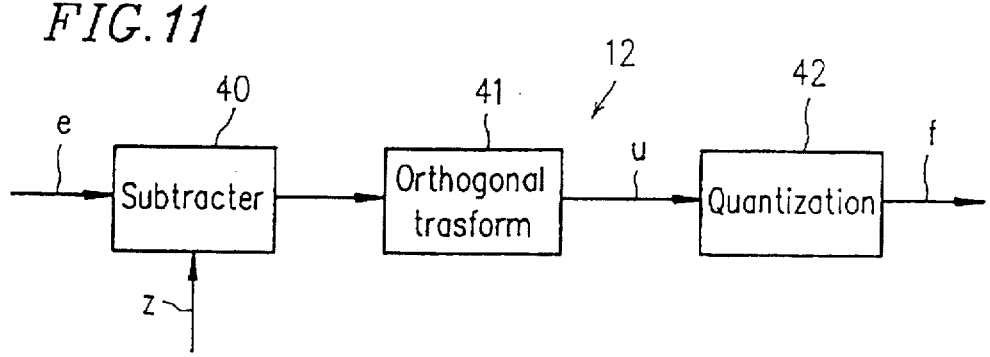
FIG. 11 is a block diagram showing details of an image compression section.

As shown in FIG. 11, the image compression section 12 includes a subtracter 40, an orthogonal transform section 41, and a quantization section 42. The subtracter 40 derives a difference between the corrected image picture signal e and the restored image picture data z, and outputs the result to the orthogonal transform section 41. The orthogonal transform section 41 performs an orthogonal transform process for the difference signal so as to orthogonal transformed signal u, which is output to the quantization section 42. The quantization section 42 subjects the orthogonal transformed signal u to quantization, so as to generate and output a compressed signal f.

Figure 12:
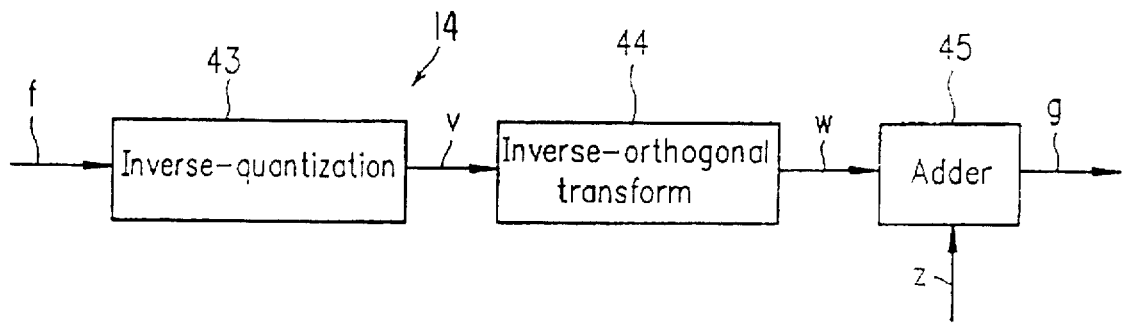
FIG. 12 is a block diagram showing details of an image decompression section.

As shown in FIG. 12, the image decompression section 14 includes an inverse-quantization section 43, an inverse orthogonal transform section 44, and an adder 45. The inverse-quantization section 43 receives the compressed signal f and subjects the compressed signal f to inverse-quantization, so as to output an inverse-quantized signal v to the inverse orthogonal transform section 44. The inverse orthogonal transform section 44 subjects the inverse-quantized signal v to inverse orthogonal transform, so as to generate and output an image signal w to the adder 45. The adder 45 derives a sum of the image signal w and the restored image picture data signal z, so as to output the summed signal as the restored image picture signal g.

By adopting DCT (Discrete Cosine Transform) and inverse DCT, in particular, for the orthogonal transform performed at the orthogonal transform section 41 and the inverse orthogonal transform section 44, the present invention can be easily applied to general image compression devices which have been put to practical use.

Figure 13:
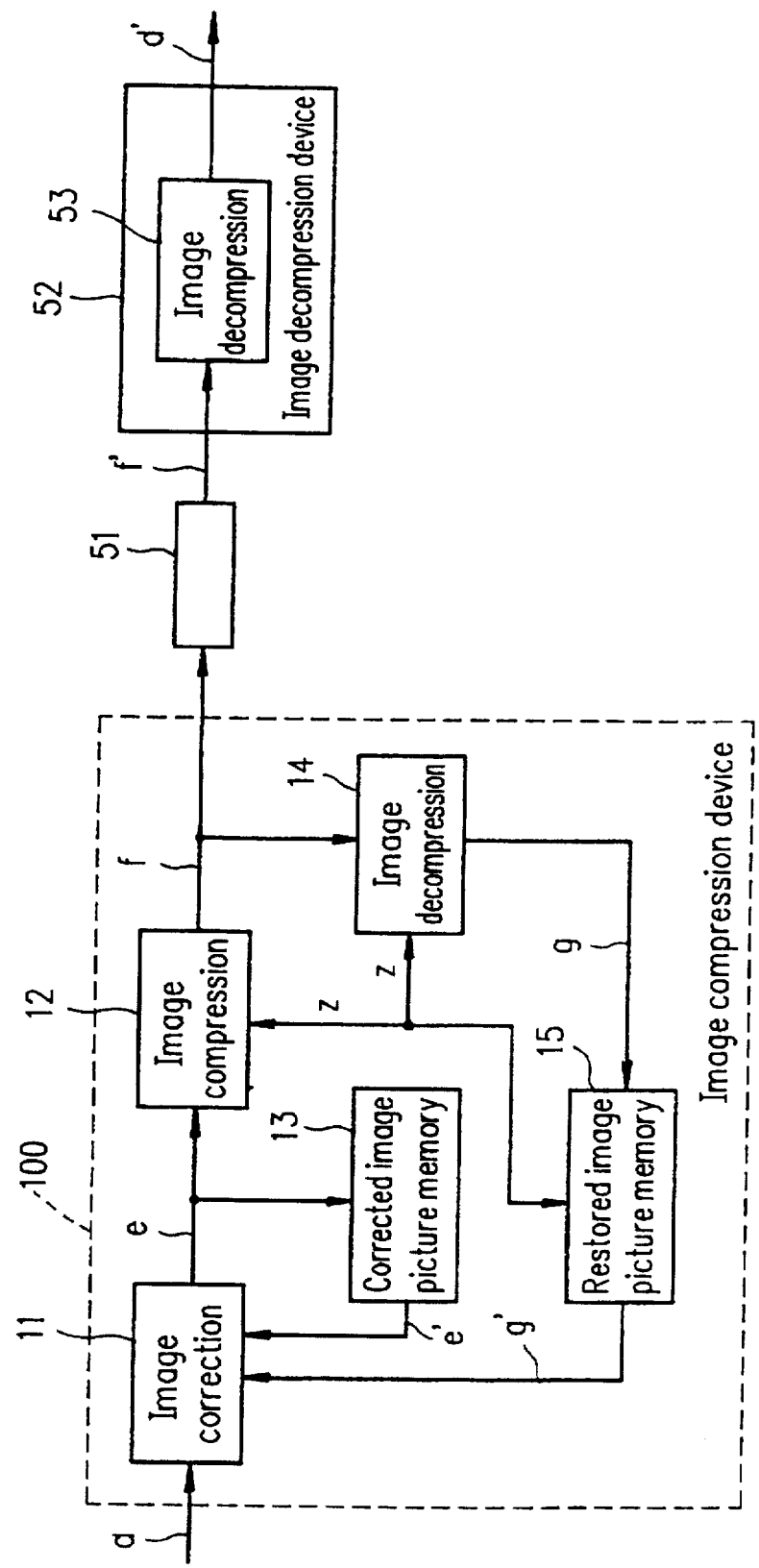
FIG. 13 is a block diagram showing a configuration for a video phone system incorporating the image compression device according to an example of the present invention.

Next, an example where the present invention is applied to a video phone system will be described. FIG. 13 is a block diagram showing a configuration for a video phone system incorporating the image compression device 100 shown in FIG. 1, the video phone system complying with the H.261 standard.

In FIG. 13, constituent elements which also appear in FIG. 1 are indicated by the same reference numerals attached thereto. Since the image compression device 100 complies with the H.261 standard, a restored image picture signal z supplied from the restored image picture memory 15 to the image compression section 12 carries data of a previous image picture. A compressed signal f output from the image compression device 100 is transferred via a communication path 51, and is input to an image decompression section 53 of an image decompression device 52 as a compressed signal f'. The image decompression section 53 subjects the compressed signal f' to an image decompression process, so as to generate a restored image picture signal d'. Since the image compression section 100 performs an image compression process such that the restored image picture signal d' has little block distortion, the image decompression section 53 has a similar configuration to that of the image decompression section 14 shown in FIG. 12. In other words, the image decompression section 53 is not required to have any block distortion elimination filters.

As described above, in accordance with the image compression device 100 of the above example, correction is conducted for an original image picture (pixel values) in a compression target block at a boundary between a compressed block and a compression target block by referring to a restored image picture and the original image picture or a corrected image picture in a compressed block, so that the block distortion occurring in the restored image picture in the block boundary after the image decompression become little. As a result, the image compression device 100 of the present invention has the following advantages as compared with conventional image compression/decompression devices.

Figure 26:
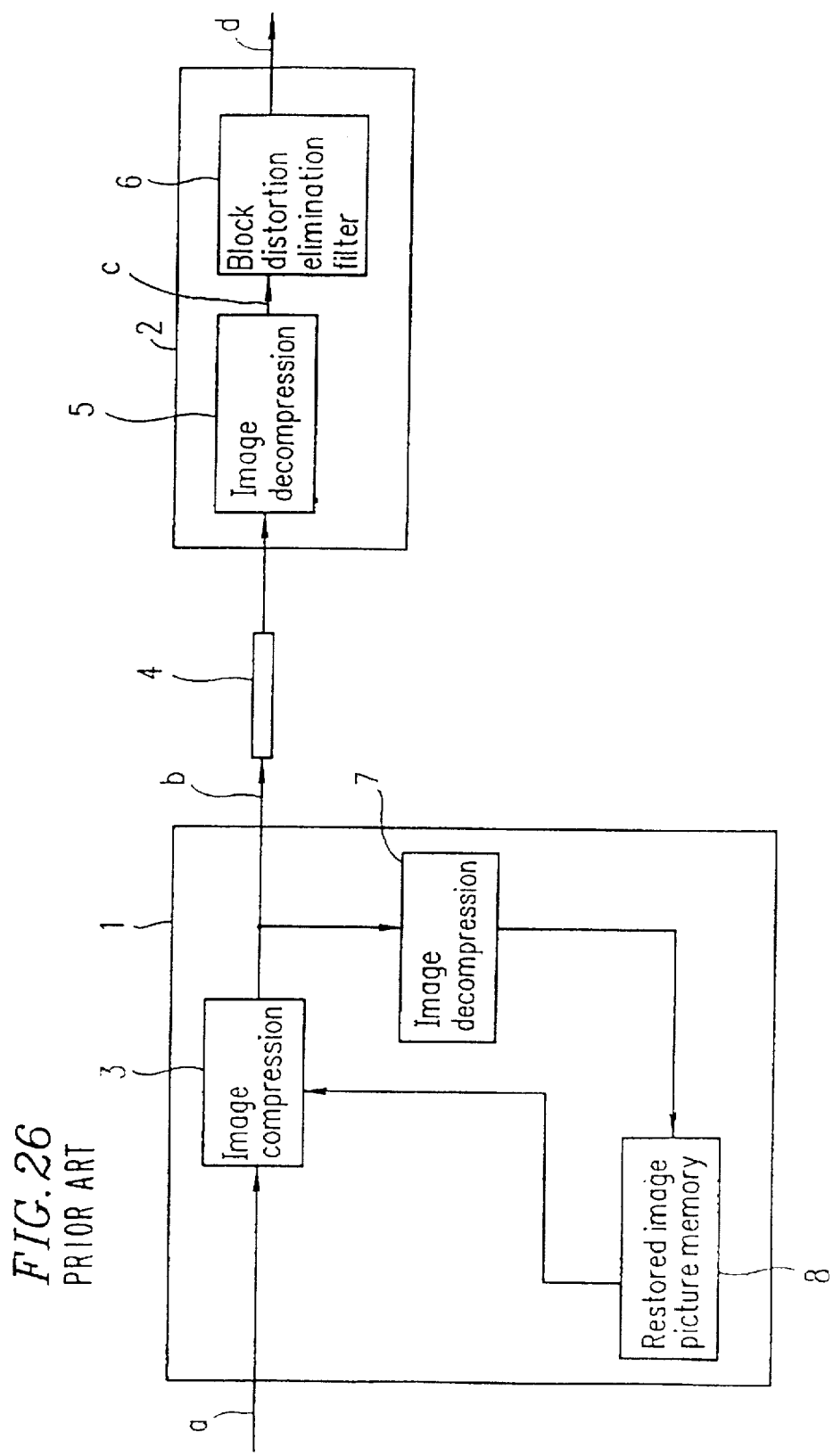
FIG. 26 is a block diagram showing a configuration for a video phone system including a conventional image compression device incorporating a block distortion elimination filter.

As compared with the conventional image compression/ decompression device shown in FIG. 26 including the image decompression device 2 incorporating the block distortion elimination filter 6, the present invention can provide image pictures with even better quality, since block distortion is previously (i.e., when compressing the image picture) corrected only with respect to the block boundaries of a restored image picture, instead of the entire restored image picture, so that the block distortion at the block boundaries is efficiently eliminated.

Next, the effect of block distortion reduction according to the present invention will be described with reference to the drawings and with respect to the following two cases.

Figure 14:
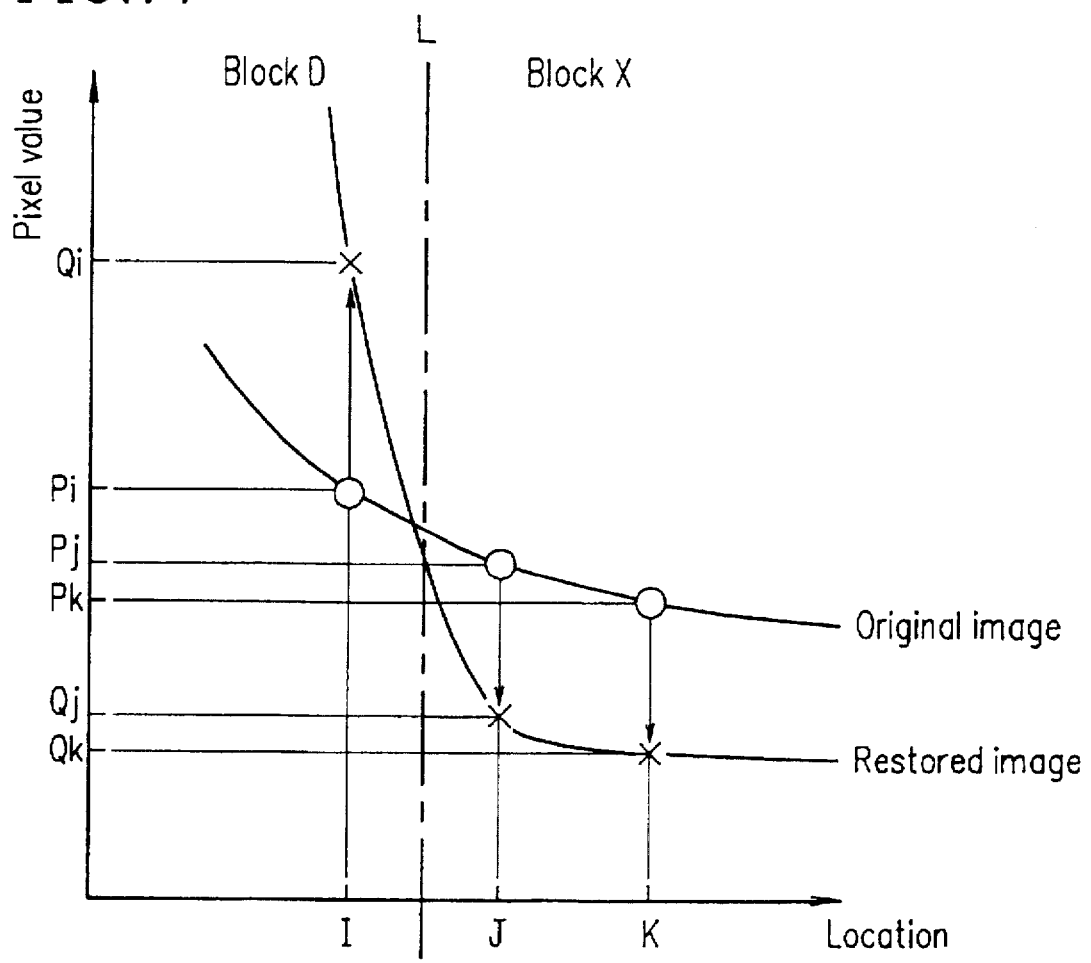
FIG. 14 is a diagram for describing discontinuity of pixel values at a block boundary owing to block distortion.

Case 1: a case where discontinuity occurs in a block boundary due to block distortion (FIG. 14).

Figure 15:
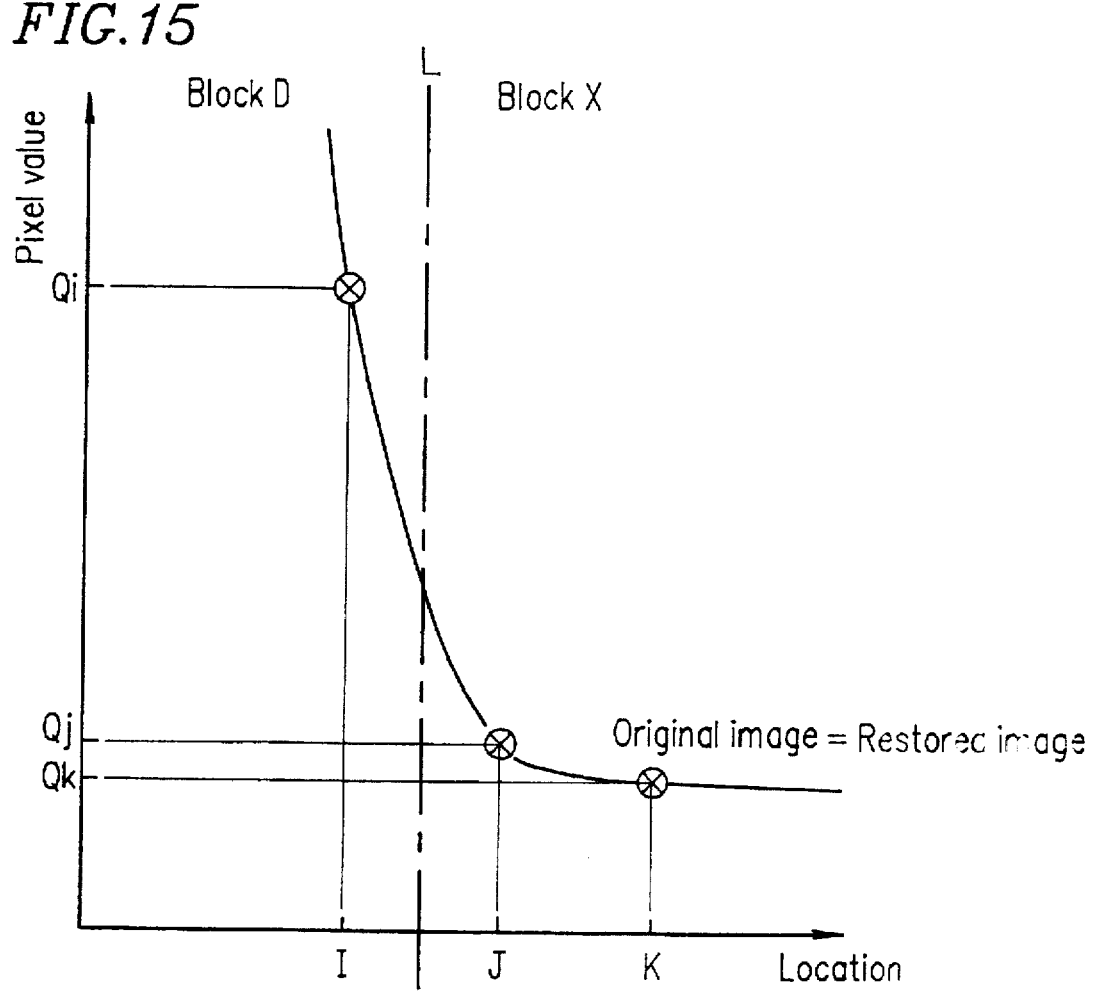
FIG. 15 is a diagram for describing discontinuity of pixel values at a block boundary resulting from the characteristics of an original image picture.

Case 2: a case where discontinuity occurs due to a drastic change in the pixel values of an original image in the vicinity of a block boundary, instead of any error in the image compression/decompression process (i.e., original image picture is identical with the restored image picture) (FIG. 15).

Figure 16:
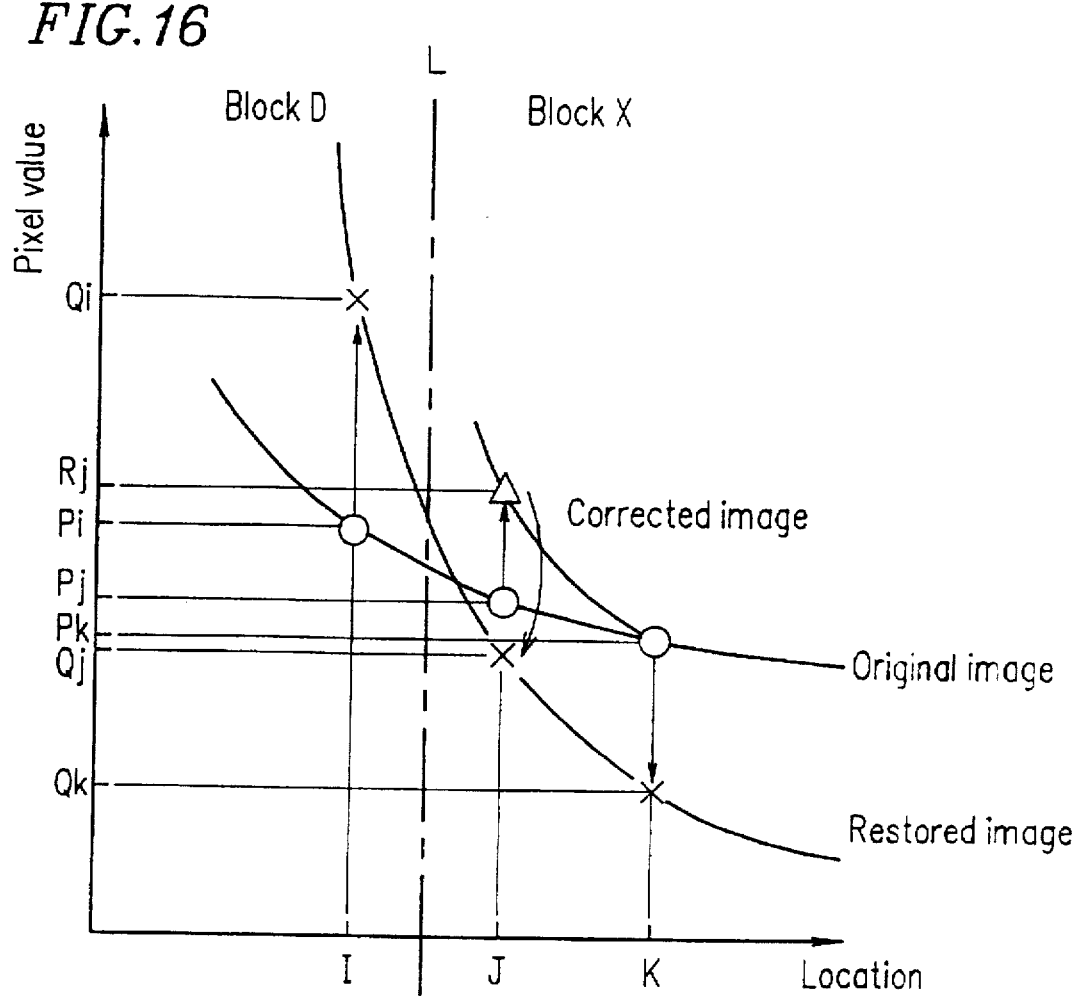
FIG. 16 is a diagram for describing the elimination of the discontinuity of pixel values at a block boundary owing to block distortion shown in FIG. 14, the elimination achieved by the image compression device of the present invention.

The image compression device 100 according to the present invention performs correction for pixels adjoining block boundaries in a compression target block, and then subjects the block to an image compression process. For an image picture of Case 1, as shown in FIG. 16, a pixel value $P_j$ of a pixel J in a compression target block X, adjacent to a block boundary L, in an original image picture is corrected to $R_j$, and thereafter the block X is subjected to an image compression/decompression process. As described above, the corrected pixel value $R_j$ is set to a larger value in order to compensate for the decrease in pixel values due to errors in the restored image picture. Accordingly, even if such an error occurs that the pixel values in a block D are increased and that the pixel values in the block X are decreased (FIG. 14) during the image compression/decompression process for the block X, pixels I, J, and K take pixel values $Q_i$, $Q_j$, and $Q_k$ in the restored image picture, respectively (FIG. 16). Thus, no discontinuity occurs in the vicinity of the block boundary, thereby preventing block distortion from occurring.

Figure 17:
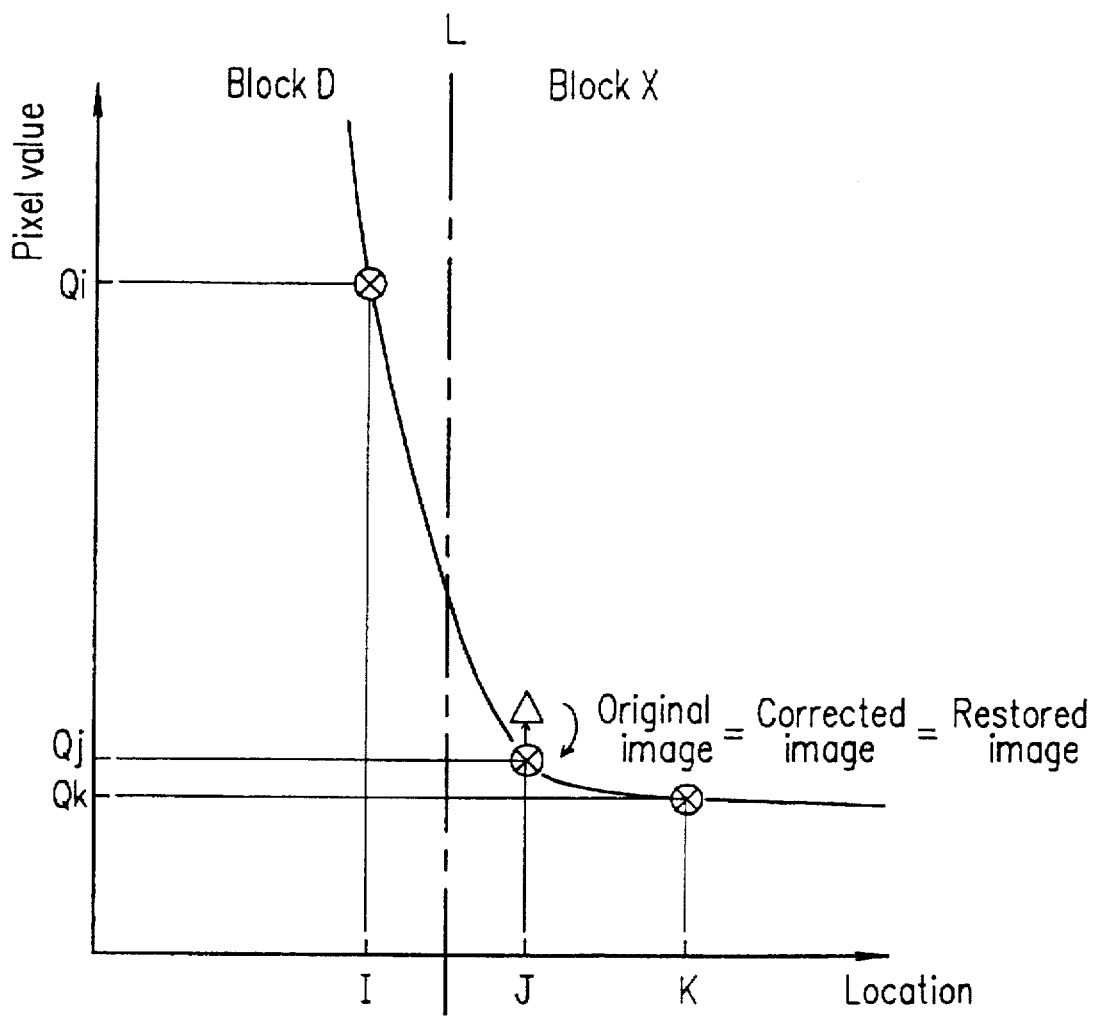
FIG. 17 is a diagram for describing the conservation of the discontinuity of pixel values at a block boundary resulting from the characteristics of an original image picture shown in FIG. 15.

As for an image picture of Case 2, as shown in FIG. 17, the original image picture and the restored image picture have the same pixel values. As a result, when corrected pixel values are calculated in accordance with Eq. 1 above, the difference between the pixel values in the original image picture and those in the restored image picture becomes zero, so that the value of the term $K \times (Q_i - P_i)$ becomes zero. Thus, the pixel values in the corrected image picture are equal to the pixel values in the original image picture, that is, the pixel values $R_j$, $P_j$, and $Q_j$ of the pixel J in the corrected image picture are all equal ($R_j = P_j = Q_j$). Given that no error occurs in the corrected image picture during the image compression/decompression process, the pixels I, J, and K take pixel values $Q_i$, $Q_j$, and $Q_k$ in the restored image picture, respectively, indicative of the conservation of the characteristics of (i.e., discontinuity) of the pixel values in the original image picture at the block boundary.

On the contrary, conventional methods for eliminating block distortion perform the elimination of block distortion based only on the characteristics of the restored image picture, so that Case 1 cannot be distinguished from Case 2, regardless of the kind of block distortion elimination process conducted. Therefore, the same block distortion elimination process is inevitably conducted for both discontinuity types, i.e., discontinuity at a block boundary occurring due to block distortion, and discontinuity at a block boundary occurring due to the characteristics of the original image picture.

In accordance with the image compression device of the present invention, block distortion occurring in the restored image picture is corrected during the image compression, instead of the image decompression, by referring to an original image picture and a restored image picture. Therefore, by conducting image compression with the image compression device, more effective elimination of block distortion can be achieved as compared with conventional techniques where the block distortion is eliminated in an image decompression device. As a result, image picture having higher fidelity to the original image picture can be obtained at an image decompression device.

In comparison with the image compression device of the conventional technique, where image compression processes are repeated for the elimination of block distortion, the image compression device of the present invention results in only a slight increase in the processing time by an amount of time required for the image correction for pixel values at block boundaries. Moreover, according to the present invention, the processing time (including the block distortion elimination process) remains constant regardless of the characteristics of the original image picture applied to the image compression device. Therefore, it is easy to realize device requiring real-time processing.

Figure 18:
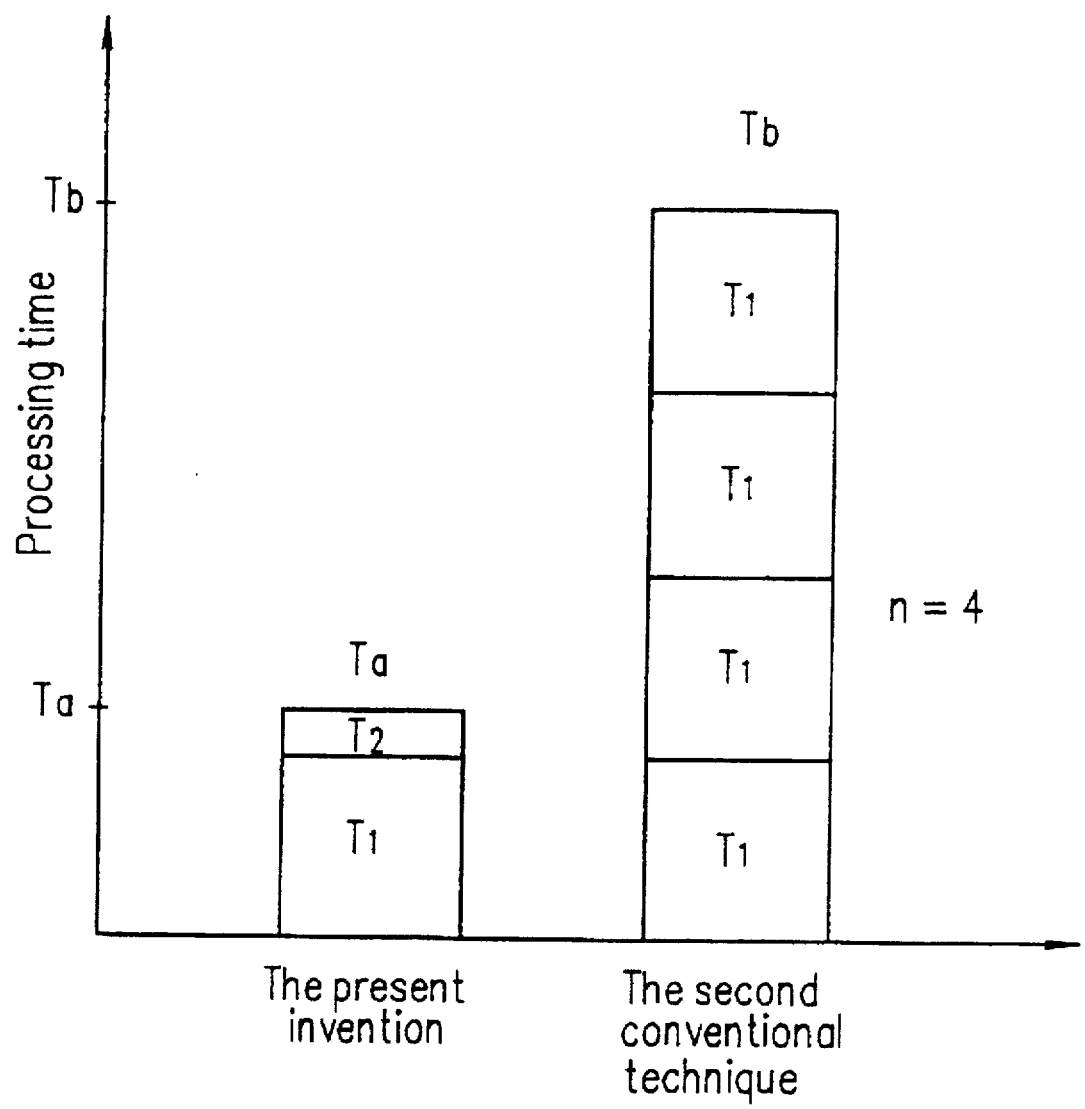
FIG. 18 is a diagram showing a comparison between the processing time required by the image compression device of the present invention and the processing time required by the second conventional technique.

FIG. 18 shows a comparison between the processing time required by the image compression device of the present invention and the processing time required by an image compression device of the second conventional technique.

As shown in FIG. 18, the time Ta which the image compression device of the present invention requires for the processing of image data in one block is equal to a sum of a time $T_1$ required for one image compression process and a time $T_2$ required for one image correction process (i.e., $Ta = T_1 + T_2$). On the other hand, the time Tb which the image compression device of the second conventional technique requires for the processing of image data in one block is expressed as $Tb = N \times T_1$ (where N represents the number of image compression processes required). According to the second conventional technique, the relationship $T_1 << T_2$ holds in general, so that Ta is smaller than Tb when N is larger than 1. Thus, the image compression device of the present invention requires a considerably shorter processing time.

Furthermore, the image compression device of the second conventional technique requires a different number N of image compression processes depending on the characteristics of the image contained in the image picture, thereby resulting in different processing times required for different blocks. Such a variation in the processing time constitutes a problem in the configuration of the overall image compression system. On the contrary, the image compression device of the present invention requires a constant processing time for every block, so that it is easy to construct an image compression system for eliminating block distortion.

The above-mentioned advantages according to the present invention are especially conspicuous when it is applied to an image compression device that is liable to cause block distortion and yet requires real-time processing, e.g., video phone systems complying with the H.261 standard.

Figure 19:
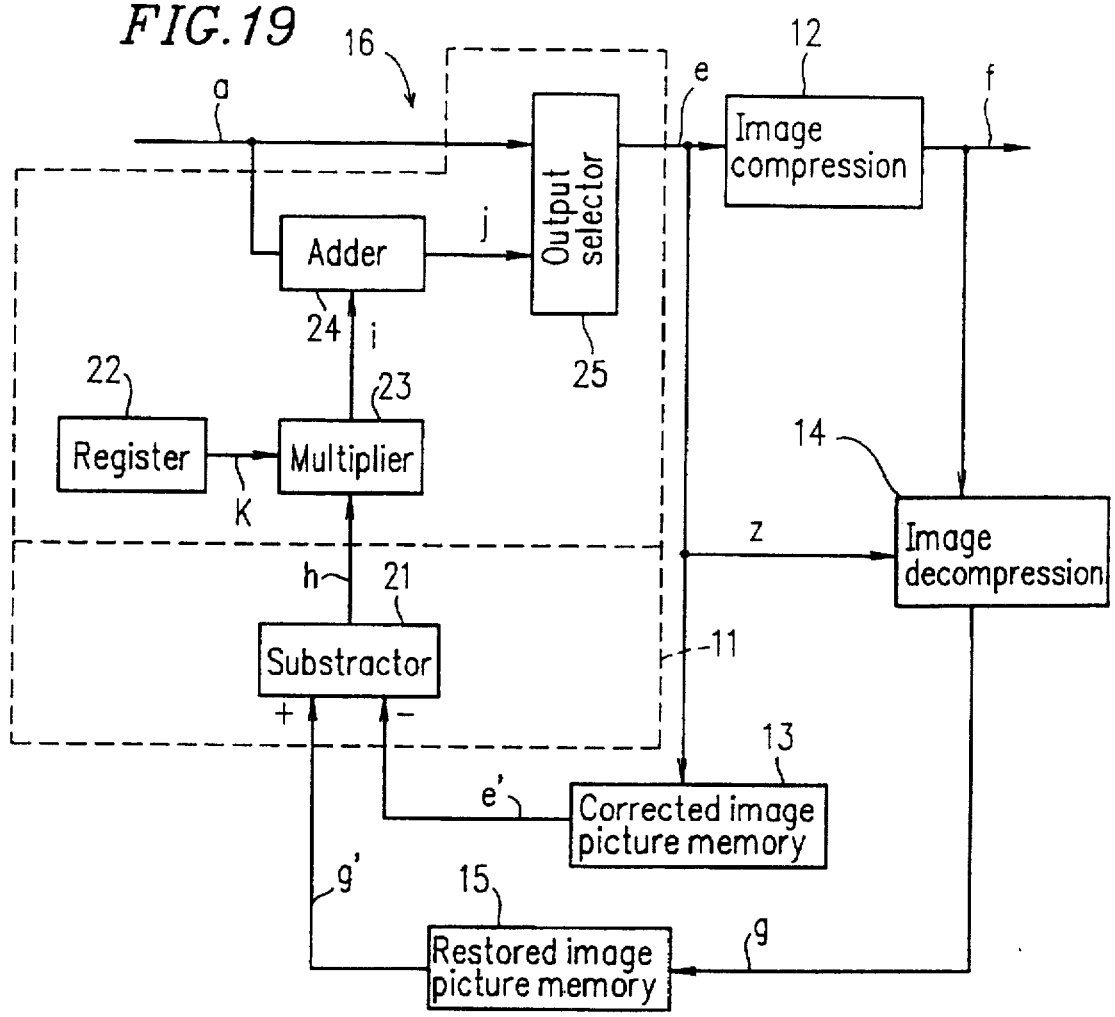
FIG. 19 is a block diagram showing a detailed configuration for an image compression device according to an example of the present invention.

In the above-described example, as shown in FIG. 19, a subtracter 21 is used for an operation for processed pixel values fed from a corrected image picture memory 13 and a restored image picture memory 15. The subtracter 21 conducts the operation for the processed pixel values by deriving a difference value h between a processed restored pixel value (restored image picture signal g') and a processed corrected pixel value (corrected image picture signal e') of a given location in a compressed block adjoining a compression target block. A multiplier 23 receives a correction coefficient K from a register 22, in which the correction coefficient K (where 0<K<1) is set as a parameter for a correction operation, and performs a first correction operation by multiplying the correction coefficient K and the difference value h, which is an operational result of the processed pixel value. As a result of the first correction operation, the multiplier 23 outputs a multiplied signal i to an adder 24. The adder 24 performs a second correction operation by adding the multiplied signal i and a pixel value of a target pixel in the compression target block in the original image picture (input original image picture signal a). As a result of the second correction operation, as an added signal j is output to an output selector 25. The output selector 25 switches between the added signal j and the original image picture signal a, in accordance with the location of the target pixel, so as to select and output either one of the signals j and a as an output corrected pixel value (corrected image picture signal e).

Figure 20:
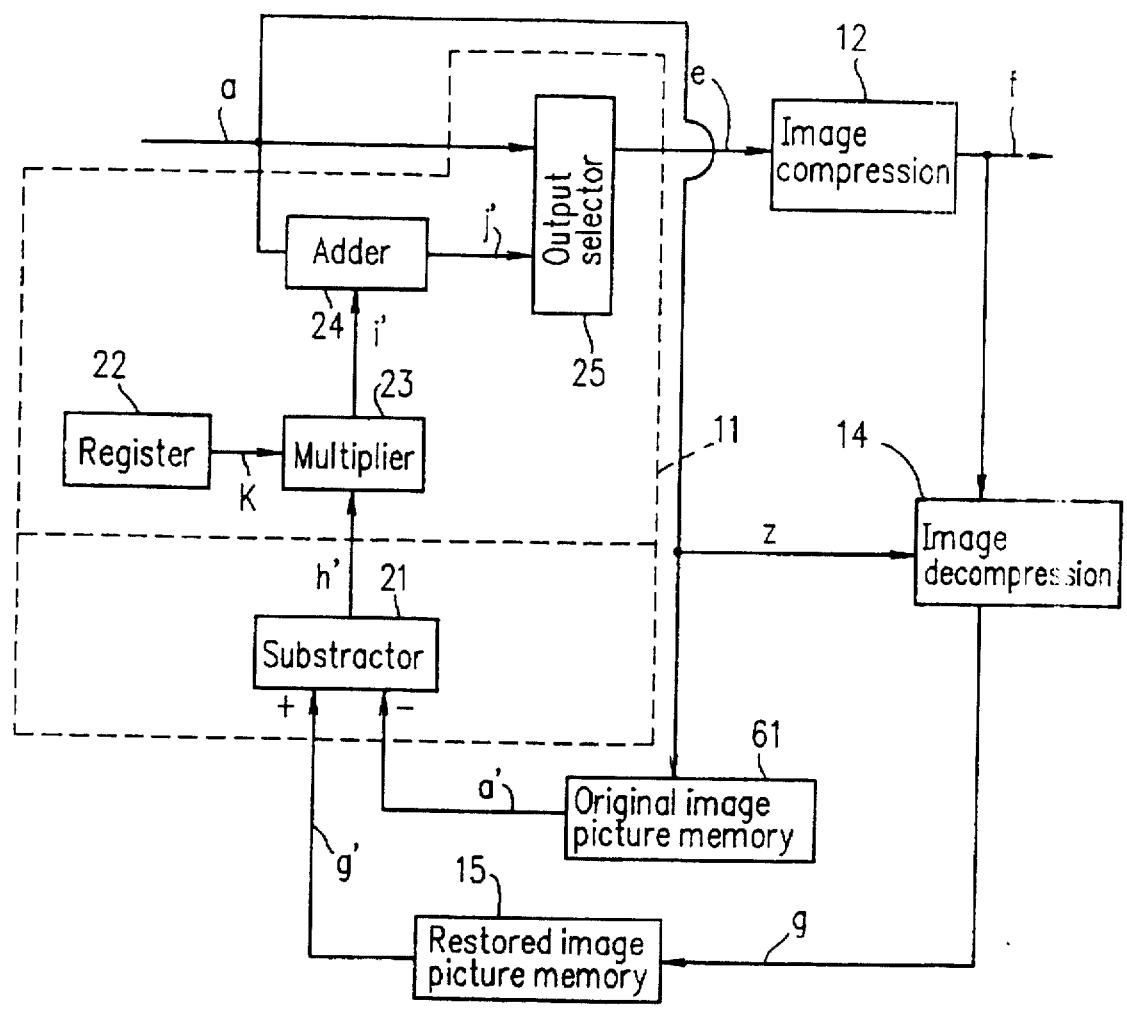
FIG. 20 is a block diagram showing a detailed configuration for an image compression device according to another example of the present invention.

Alternatively, as shown in FIG. 20, it is applicable to replace the corrected image picture memory 13 with an original image picture memory 61. The original image picture memory 61 receives and stores an input original image picture signal a, and outputs the input original image picture signal a' to a subtracter 21. The subtracter 21 performs an operation for processed pixel values by deriving a difference value h' between a processed restored pixel value (restored image picture signal g') and an original pixel value (original image picture signal a') of a given location in a compressed block adjoining a compression target block. Thus, by using the difference value h' instead of the difference value h, the above-mentioned first correction operation may be performed by using a multiplier 23 so as to generate a multiplied signal i', and the above-mentioned second correction operation may be performed by using an adder 24 so as to generate an added signal j'. An output selector 25 switches between the added signal j' and the original image picture signal a, in accordance with the location of the target pixel, so as to select and output either one of the signals j' and a as an output corrected pixel value (corrected image picture signal e). The same effects as in the above-described example can be attained by the use of the original image picture memory 61.

The differences between the use of the corrected image picture memory 13 and the use of the original image picture memory 61 are as follows.

Figure 21:
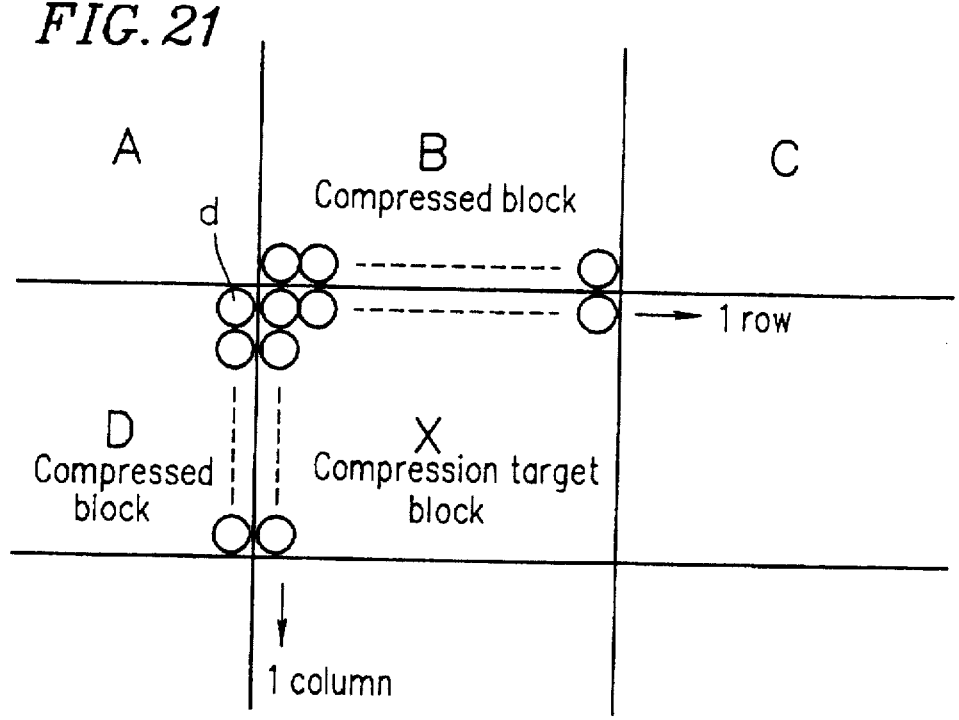
FIG. 21 is a diagram for describing the relationship between target pixels in a compression target block and reference pixels in processed blocks at a block boundary.

In the case where the corrected image picture memory 13 is used, as shown in FIG. 21, the reference pixels to be used for the correction of a compression target block X are a column of pixels located (vertically) along a boundary between a processed block D and the compression target block X, and a row of pixels located (horizontally) along a boundary between a processed block B and the compression target block X. Among these reference pixel values stored in the corrected image picture memory 13, only the uppermost reference pixel d of the block D has a corrected pixel value because, when the block D was a compression target block itself, only the pixel d was a correction target pixel. All the other reference pixels, other than the pixel d, have their pixel values in the original image picture (original pixel values). On the other hand, in the case where the original image picture memory 61 is used as in FIG. 20, all the reference pixels including the pixel d have their original pixel values.

In the above example, the original pixel value of the target pixel is subjected to a predetermined correction process by performing an operation based on a difference value h between the restored pixel value and the corrected pixel value (or the original pixel value) by using the register 22, the multiplier 23, and the adder 24 as image data correction means. However, the method of performing an operation for the processed pixel value is not limited to the above, but may be implemented as follows, for example: a sum of a restored pixel value and a corrected pixel value (or the original pixel value) is derived; and the sum is multiplied by a correction coefficient K (=½) so as to give a corrected pixel value. In this case, the correction coefficient K may be stored in a register or the like, as in the above example.

In the case where the restored pixel value is equal to the corrected pixel value (or the original pixel value), the resultant corrected pixel value is also equal to the corrected pixel value. By utilizing this fact, it becomes possible to determine whether block distortion has occurred or not. Accordingly, an operation is conducted which performs a predetermined correction process for the original pixel value of the target pixel value in such a manner that the pixel values do not become discontinuous at block boundaries if block distortion is occurring.

In the above example, as shown in FIG. 21, the reference pixels for the target pixels in the compression target X are the lowermost row of pixels in the compressed block B, which adjoin the targets pixels, and the rightmost column of pixels in the compressed block D, which also adjoin the targets pixels. Accordingly, a target pixel located in the upper left corner of the compression target block X has two reference pixels, i.e., one in each of the blocks B and D. The correction of the pixel value of this target pixel in the upper left corner of the block X can be conducted by, for example, correcting the pixel values of the uppermost row of pixels of the block X (i.e., in a horizontal direction) first, and then correcting the pixel values of the leftmost column of pixels of the block X (i.e., in a vertical direction). As a result, the pixel value of this target pixel can be corrected to such a value that the block distortion is reduced in both the vertical and horizontal directions. Such a correction places a priority on the block distortion along the horizontal direction.

Figure 22:
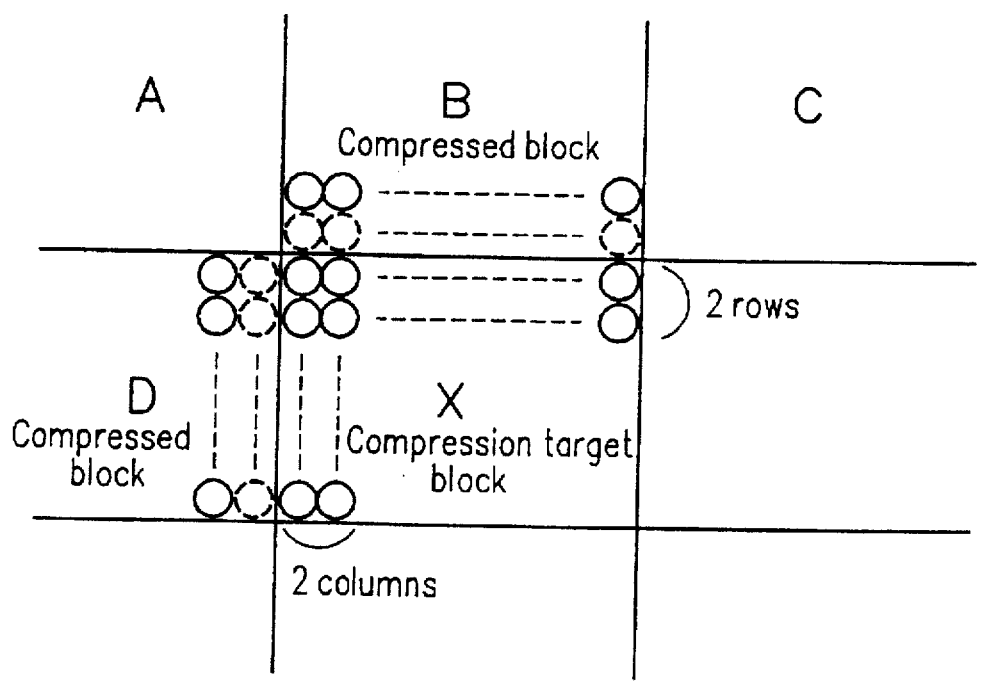
FIG. 22 is another diagram for describing the relationship between target pixels in a compression target block and reference pixels in processed blocks at a block boundary.
Figure 25:
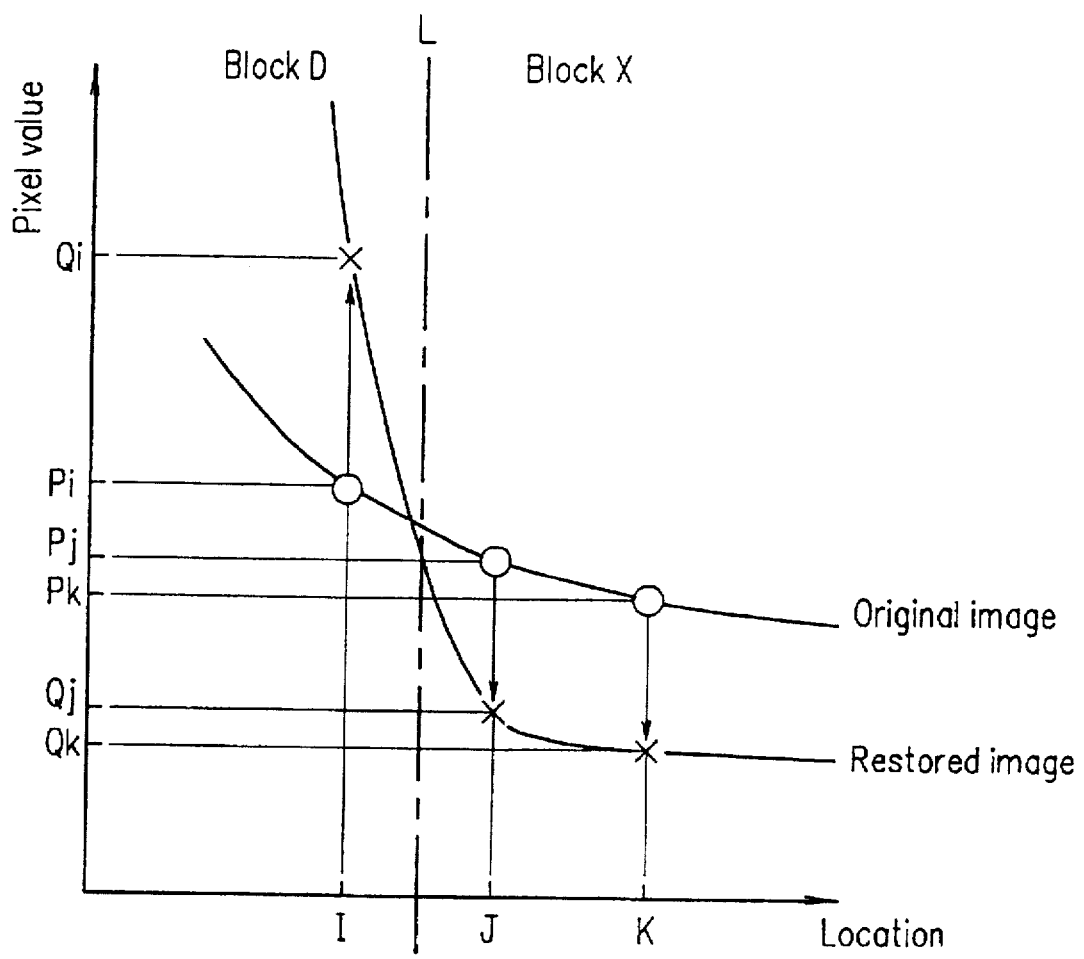
FIG. 25 is a schematic diagram for describing a mechanism which causes block distortion.

Alternatively, it is applicable to select reference pixels as shown in FIG. 22. That is, the second closest row, instead of the closest row, of pixels in the block B can be used as reference pixel values. Similarly, the second closest column, instead of the closest column, of pixels in the block D can be used as reference pixel values.

As for the target pixels, too, it is applicable to use the two or more uppermost rows and two or more leftmost columns of pixels as the target pixels, instead of only the uppermost row and leftmost column of pixels. The references pixels to be used for such reference pixels may be the closest row and column of pixels in reference blocks to the compression target block X, or may alternatively be a number of closest (i.e., the closest, second closest, . . . , etc.) rows and columns of pixels in reference blocks to the compression target block X. It is also applicable to use the second closest row and second closest column of pixels to the compression target block X, as mentioned above.

As described above, in accordance with the image compression device and method of image compression of the present invention, pixel values in an compression target block in an original image picture are corrected as follows at a boundary between the compression target block and a compressed block: The pixel value of a target pixel in the compression target block is previously corrected by using a reference pixel value in a compressed block, i.e., the pixel value of the reference pixel in a restored image picture and a corrected image picture (or an original image picture) so that any pixel value error (block distortion) occurring at block boundaries in a restored image picture obtained by decompressing a once-compressed image picture.

Thus, the correction of a pixel value in a compression target block (i.e., a block to be compressed next) in an original image picture is performed by using a reference pixel value in a compressed block. As a result, an image picture having little block distortion can be restored after decompressing a compressed signal (with an image decompression device) which has been transferred after being compressed. As opposed to conventional techniques, the present invention does not require a repetition of image compression processes in order to make the error between the original image picture and the restored image picture sufficiently small. Therefore, the present invention does not require a long processing time. Moreover, the processing time required for each block does not vary depending on the image contained in the original image picture. Furthermore, the present invention makes it possible to determine whether a drastic change (discontinuity) in the pixel value at a block boundary is due to block distortion or the characteristics inherent to the original image picture, so that only the discontinuity due to block distortion is subjected to a correction for elimination thereof. Accordingly, a restored image picture having reduced block distortion can be easily obtained without affecting the characteristics of the original image picture.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image compression device for performing an image compression process for each one of a plurality of non-overlapping blocks into which an original image picture is divided, the device comprising:

image correction means for generating a corrected image picture for reducing a block distortion occurring at a block boundary in a restored image picture generated by decompressing a compressed image picture, wherein the image correction means performs a process for reducing the block distortion occurring at a block boundary between a target block to be compressed and a processed block already compressed and adjoining the target block by: referring to a restored pixel value of a restored image obtained by decompressing a compressed image of the processed block, and at least one of an original pixel value of an original image of the processed block and a corrected pixel value of a corrected image of the processed block; and performing an operation for the restored pixel value and at least one of the original pixel value and the corrected pixel value so as to generate a corrected pixel value of the target block and output a corrected image for the target block.

2. An image compression device according to claim 1, wherein the image correction means comprises:

first pixel value operation means for performing a predetermined operation based on a restored pixel value and at least one of an original pixel value and a corrected pixel value of a reference pixel present in a predetermined position in the processed block and outputting a result of the operation as a first pixel value;

second pixel value operation means for performing a correction process, based on the first pixel value, for an original pixel value of a target pixel present in a predetermined position of the target block corresponding to the reference pixel of the processed block and outputting a second pixel value; and selection means for selecting either the original pixel value of the target pixel or the second pixel value and outputting the selected pixel value as a corrected pixel value of the target pixel.

3. An image compression device according to claim 2 further comprising image compression means for generating the compressed image by performing a predetermined image compression process for the corrected image output from the image correction means, and image decompression means for generating the restored image by decompressing the compressed image.

4. An image compression device according to claim 2, wherein the second pixel value operation means comprises means for setting a correction coefficient K and correction operation means.

5. An image compression device according to claim 4, wherein the correction operation means comprises:

first operation means for performing a first operation for the first pixel value by using the correction coefficient K; and second operation means for performing a second operation for an output of the first operation means and the original pixel value of the target pixel and outputting the second pixel value.

6. An image compression device according to claim 5, wherein the first pixel value operation means is a subtracter for outputting a difference value between the restored pixel value and either the original pixel value or the corrected pixel value of the reference pixel;

the first operation means is a multiplier for outputting a multiplied value obtained by multiplying the difference value by the correction coefficient K;

the second operation means is an adder for outputting a value obtained by adding the multiplied value to the original pixel value of the target pixel; and the correction coefficient K has a value in the range of 0<K<1.

7. An image compression device according to claim 3 further comprising first image storage means for storing either an input original image picture or the corrected image output from the image correction means, and second image storage means for storing the restored image output from the image decompression means.

8. An image compression device according to claim 7, wherein the first pixel value operation means performs the predetermined operation by using the corrected pixel value of the corrected image stored in the first image storage means and the restored pixel value of the restored image stored in the second image storage means.

9. An image compression device according to claim 2, wherein the target pixel, for which the correction process is performed by using the reference pixel, consists of at least one row and one column of pixel adjoining the block boundary.

10. An image compression device according to claim 5, wherein the target pixel, for which the correction process is performed by using the reference pixel, consists of a plurality of rows and columns of pixels adjoining the block boundary, and the second pixel value operation means comprises means for varying a value of the correction coefficient K in accordance with a distance between the block boundary and each of the plurality of rows and columns of pixels.

11. An image compression device according to claim 2, wherein the selection means outputs the second pixel value for the target pixel located at the block boundary, the correction process being performed for the target pixel by using the reference pixel, and outputs the original pixel value for any other pixel.

12. A method of image compression comprising performing an image compression process for each one of a plurality of non-overlapping blocks into which an original image picture is divided, the method further comprising a step of image correction for generating a corrected image picture for reducing a block distortion occurring at a block boundary in a restored image picture generated by decompressing a compressed image picture, wherein the image correction step comprises, so as to reduce the block distortion occurring at a block boundary between a target block to be compressed and a processed block already compressed and adjoining the target block, the steps of: referring to a restored pixel value of a restored image obtained by decompressing a compressed image of the processed block, and at least one of an original pixel value of an original image of the processed block and a corrected pixel value of a corrected image of the processed block; and performing an operation for the restored pixel value and at least one of the original pixel value and the corrected pixel value so as to generate a corrected pixel value of the target block and output a corrected image for the target block.

13. A method of image compression according to claim 12, wherein the image correction step comprises:

a first pixel value operation step for performing a predetermined operation based on a restored pixel value and at least one of an original pixel value and a corrected pixel value of a reference pixel present in a predetermined position in the processed block and outputting a result of the operation as a first pixel value;

a second pixel value operation step for performing a correction process, based on the first pixel value, for an original pixel value of a target pixel present in a predetermined position of the target block corresponding to the reference pixel of the processed block and outputting a second pixel value; and a step for selecting either the original pixel value of the target pixel or the second pixel value and outputting the selected pixel value as a corrected pixel value of the target pixel.

14. A method of image compression according to claim 13 further comprising an image compression step for generating the compressed image by performing a predetermined image compression process for the corrected image and an image decompression step for generating the restored image by decompressing the compressed image.

15. A method of image compression according to claim 13, wherein the second pixel value operation step comprises a step of setting a correction coefficient K and a correction operation step.

16. A method of image compression according to claim 15, wherein the correction operation step comprises:

a first operation step for performing a first operation for the first pixel value by using the correction coefficient K; and a second operation step for performing a second operation for a result of the first operation step and the original pixel value of the target pixel and outputting the second pixel value.

17. A method of image compression according to claim 16, wherein the first pixel value operation step is a step for generating a difference value between the restored pixel value and either the original pixel value or the corrected pixel value of the reference pixel;

the first operation step is a step for generating a multiplied value obtained by multiplying the difference value by the correction coefficient K;

the second operation means is a step for generating a value obtained by adding the multiplied value to the original pixel value of the target pixel; and the correction coefficient K has a value in the range of 0<K<1.

18. A method of image compression according to claim 14 further comprising a step of storing either an input original image picture or the corrected image, and a step of storing the generated restored image.

19. A method of image compression according to claim 18, wherein the predetermined operation in the first pixel value operation step is performed by using the stored corrected pixel value of the corrected image and the stored restored pixel value of the restored image.

20. A method of image compression according to claim 13, wherein the target pixel, for which the correction process is performed by using the reference pixel, consists of at least one row and one column of pixels adjoining the block boundary.

21. A method of image compression according to claim 16, wherein the target pixel, for which the correction process is performed by using the reference pixel, consists of a plurality of rows and columns of pixels adjoining the block boundary, and the second pixel value operation step comprises a step of varying a value of the correction coefficient K in accordance with a distance between the block boundary and each of the plurality of rows and columns of pixels.

22. A method of image compression according to claim 13, wherein the selection step is a step for outputting the second pixel value for the target pixel located at the block boundary, the correction process being performed for the target pixel by using the reference pixel, and for outputting the original pixel value for any other pixel.

* * * * *